(12) United States Patent
Bowling

(10) Patent No.: US 6,357,159 B1
(45) Date of Patent: Mar. 19, 2002

(54) DECOY APPARATUS FOR ATTRACTING ANIMALS

(76) Inventor: Patrick Bowling, 550 Boone's Mill Rd., New Haven, KY (US) 40051

(*) Notice: Subject to any disclaimer, the term of this patent is extended or adjusted under 35 U.S.C. 154(b) by 0 days.

(21) Appl. No.: 09/431,354

(22) Filed: Nov. 1, 1999

Related U.S. Application Data

(63) Continuation-in-part of application No. 08/962,717, filed on Nov. 17, 1997, now Pat. No. 5,974,720.

(51) Int. Cl.⁷ ............................................. A01M 31/06
(52) U.S. Cl. ................................................. 43/2; 43/3
(58) Field of Search ........................... 43/2, 3; 254/301, 254/309, 317

(56) References Cited

U.S. PATENT DOCUMENTS

| | | | | |
|---|---|---|---|---|
| 457,335 A | | 8/1891 | Albert | 273/119.1 |
| 505,016 A | | 9/1893 | Albert | 211/119.1 |
| 694,216 A | | 2/1902 | Thresher | 273/359 |
| 945,478 A | * | 1/1910 | Sieurin | 254/298 |
| 1,727,272 A | | 9/1929 | Caswell | 273/406 |
| 1,788,889 A | | 1/1931 | Ritchie | 273/366 |
| 2,129,781 A | | 9/1938 | Park | 43/3 |
| 2,252,795 A | | 8/1941 | Weems | 43/3 |
| 2,427,010 A | | 9/1947 | Lohr | 273/406 |
| 2,819,900 A | | 1/1958 | Brackett | 273/366 |
| 3,016,228 A | * | 1/1962 | Boomkens | 254/300 |
| 3,471,153 A | | 10/1969 | Baumler | 273/359 |
| 4,738,223 A | | 4/1988 | Andreasen | 119/839 |
| 4,821,976 A | | 4/1989 | Nakashima | 242/388.6 |
| 4,910,905 A | | 3/1990 | Girdley et al. | 43/3 |
| 4,946,642 A | * | 8/1990 | Yoshinaga et al. | 376/260 |
| 5,255,629 A | | 10/1993 | Paterson | 119/839 |

* cited by examiner

*Primary Examiner*—Robert P. Swiatek
(74) *Attorney, Agent, or Firm*—Laura M. Hagan

(57) ABSTRACT

A decoy moving apparatus for attracting animals including a set of reels attached to a clutch system which is workable on an automated drive motor system. The clutch system works to engage and disengage the reels to takeon/take-off line which is extending from the reels to at least one stake or decoy anchor reference point, wherein the line is attached to a decoy pulled between the reels and one or more anchors, whereby the takeon/take-off of the line with the decoy apparatus moves the decoy back and forth and/or rotates the decoy on its axis. The decoy may float in water, mounted to a sled type mounting base, or suspended from a wire, depending upon the habitat of the animal to be attracted to the viewer.

13 Claims, 22 Drawing Sheets

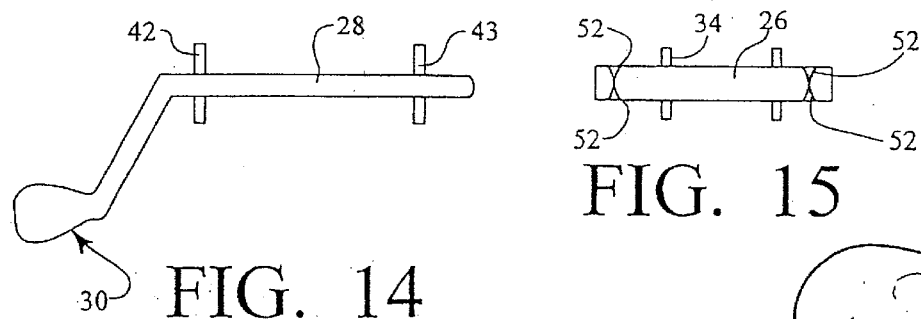
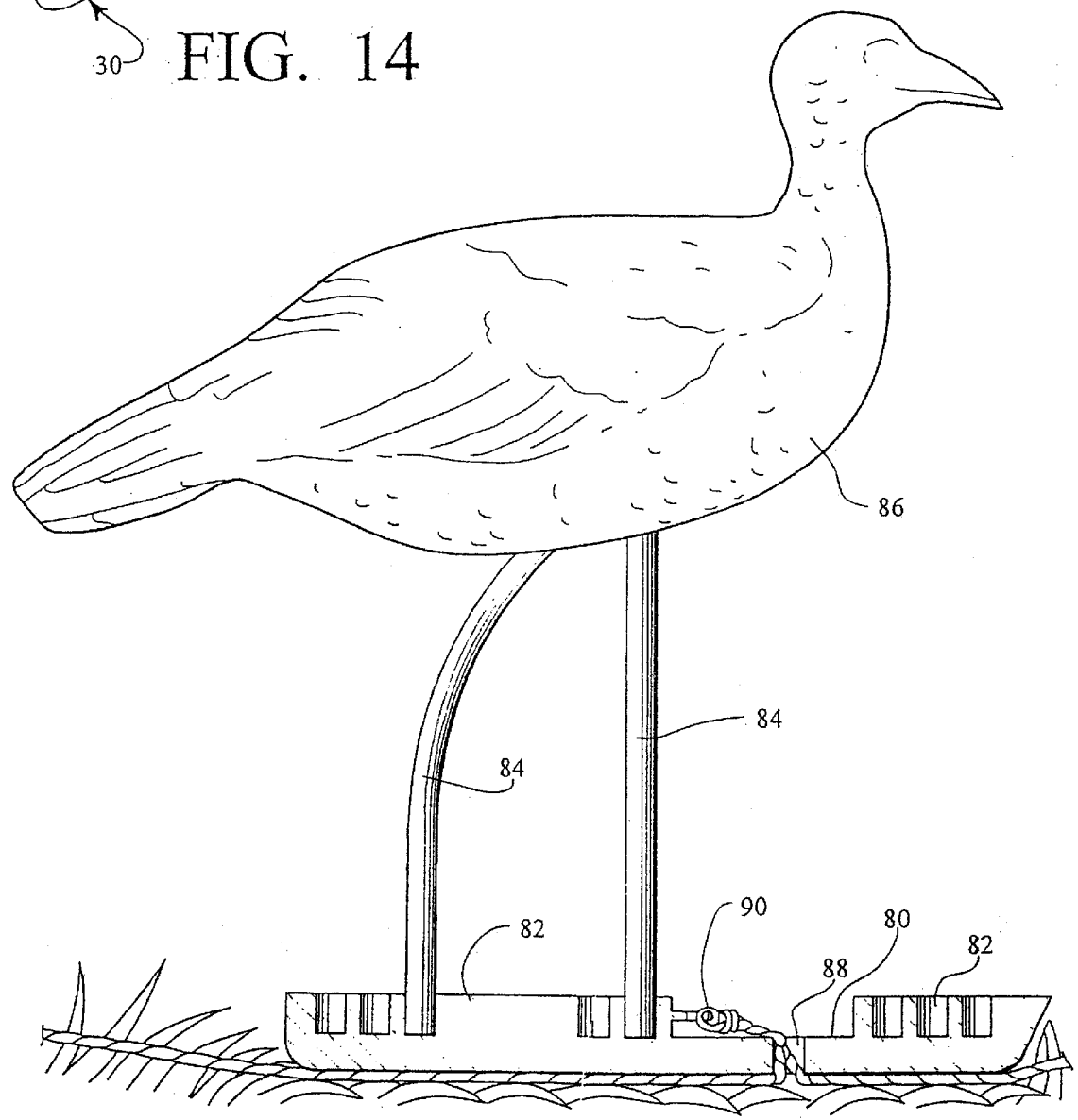
FIG. 14
FIG. 15
FIG. 17

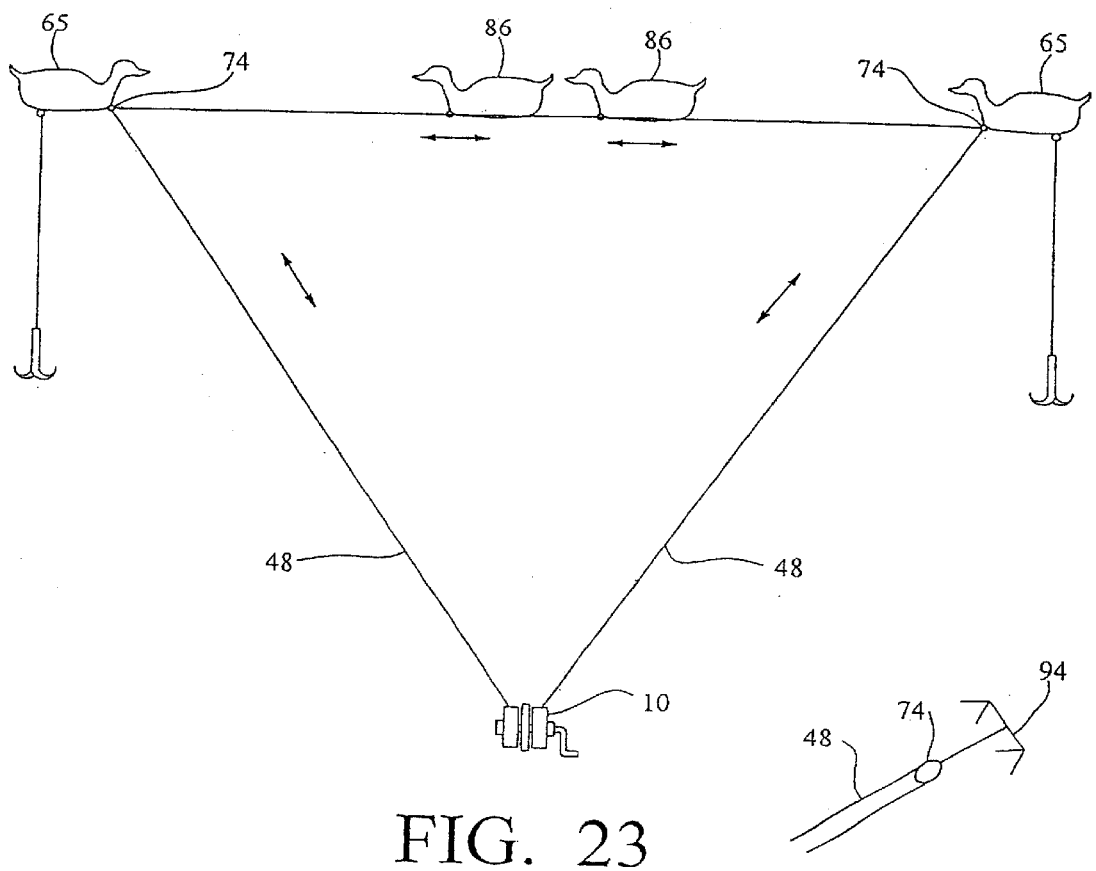
FIG. 23
FIG. 28
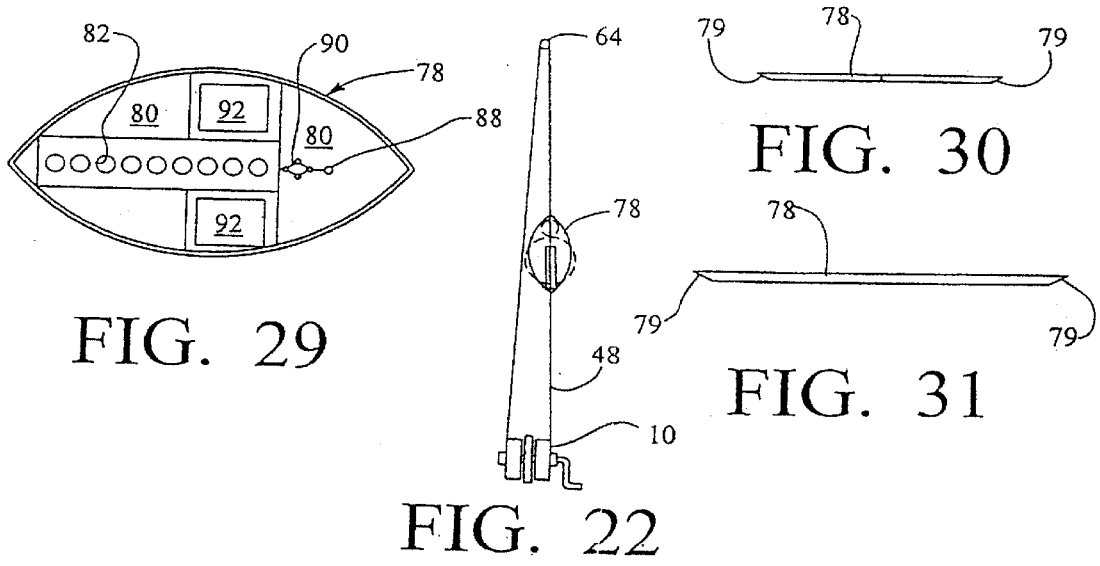
FIG. 29
FIG. 30
FIG. 31
FIG. 22

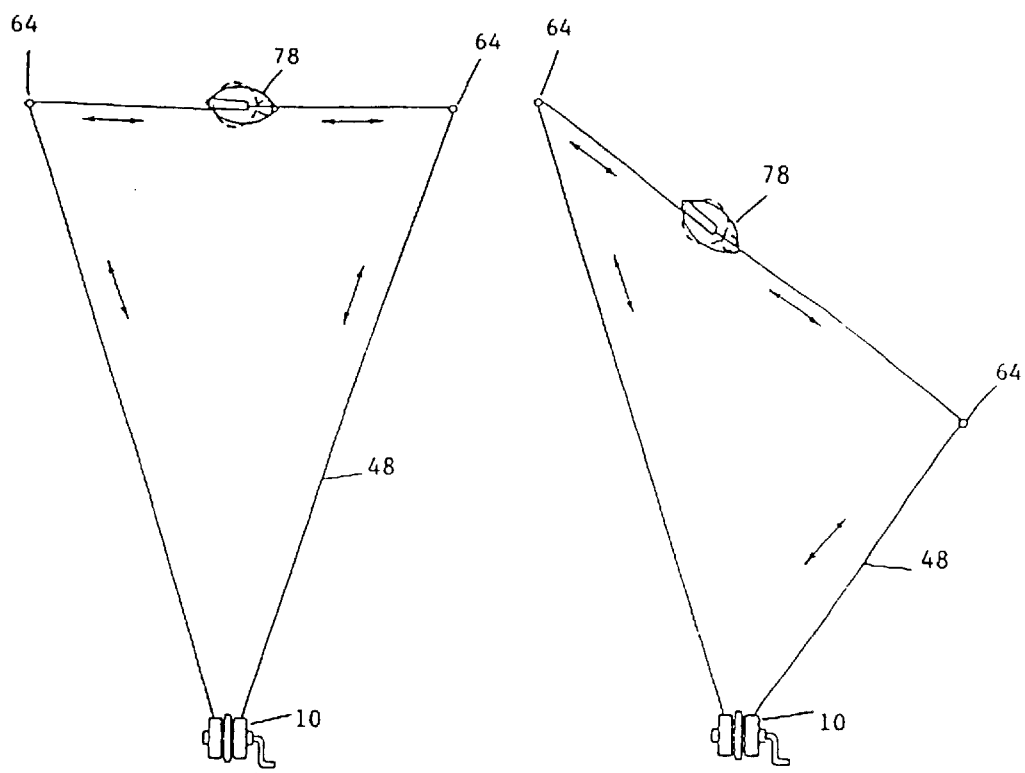
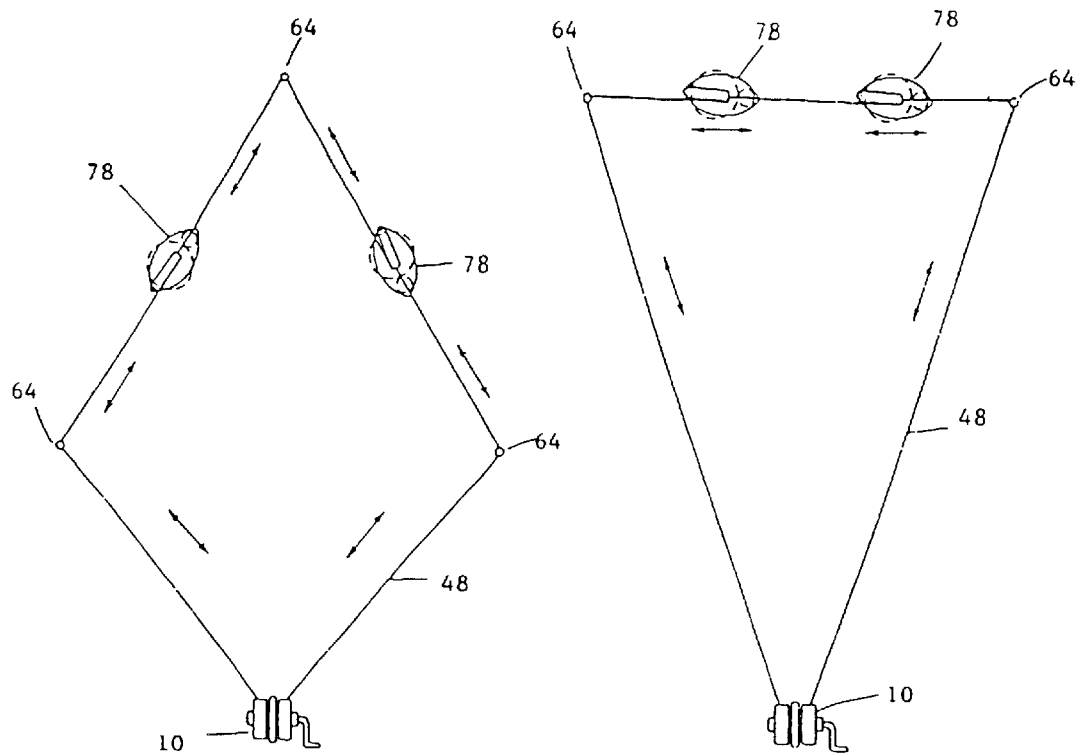
FIG. 24  FIG. 25  FIG. 26  FIG. 27

DECOY APPARATUS FOR ATTRACTING ANIMALS

This application is a continuation-in-part of application U.S. Ser. No. 08/962,717 filed Nov. 17, 1997, and now U.S. Pat. No. 5,974,720.

BACKGROUND OF THE INVENTION

This invention relates to an apparatus for moving a decoy or decoys to attract animals by moving the decoys to stimulate various motions of live animals and more particularly to a clutch system which is workable on an automated drive motor system which allows for easy mobility of the decoys.

Most conventional decoys do not move or are designed for limited movement; however, the present invention not only attracts animals, but maintains their interest due to the control and deliberate movement of the decoy by the user.

Conventional decoys are stationary or move a portion of the body, pivot or turn; however, the movement is repetitious and restricted so that prolonged exposure to the animal causes a loss of attraction. Contrary to conventional decoys, the decoy moving apparatus of the present invention is capable of moving decoys hundreds of yards if necessary in irregular patterns at various speeds.

Often the target animal will approach a still decoy, but will be lured off by other live animals. The present invention provides an important tool for both hunters and photographers for attracting animals to them by mobilizing the decoy and controlling the movement.

The movable decoy mounting base provides a means for luring the animal to the viewer. The movement of the decoy keeps the animal's attention and aids in camouflaging the activities of the viewer so that the animal is less likely to spot the viewer.

SUMMARY OF THE INVENTION

The decoy apparatus for attracting animals includes a winding apparatus and a set of reels having a line or string extending to, through or around at least one fixed reference point, wherein the line is attached to a decoy pulled between the winding apparatus and/or one or more anchors, whereby winding the string with the decoy apparatus moves the decoy back and forth and/or rotates the decoy on its axis.

A preferred embodiment of the decoy moving device includes a frame which is typically composed of one or more vertical tubular members which can be pushed into the ground or mounted from a base. A means for rotatably supporting at least a first takeon/takeoff reel and at least a second takeon/takeoff reel are supported by the frame. A preferred means for rotatable support includes a rotatable shaft in cooperative engagement with both reels supported within a sleeve mounted horizontally to the frame. A means for rotating the first takeoff reel and said second takeon reel consists of a hand crank or small electric motor. The reels may be turned in the same direction at the same time or in an opposite direction independent of one another. A means for anchoring a line extending from the reels is movably held by a stationary object such as stake, rock, tree, anchored decoy or other means which allows the line to move slidably therethrough or around so that the line can be unwound from one reel and wound onto another. The stationary object for ground applications is preferably a stake having a loop or reel attached therethrough for passage of the line. A movable decoy such as a deer, rabbit, duck, fawn, turkey, etc. is attached to a line extending from the takeoff reel through the anchor object to the takeon reel for moving the decoy back and forth from the anchor to either one of the reels. Of course, several decoys may be attached to the line at several points between a plurality of anchors.

The winding apparatus provides a means of alternating the direction of movement of the decoy by simply sliding the shaft to one side or the other of the sleeve to engage or disengage a selected reel letting the opposing reel "free-wheel" while rotating the crank. This method of engaging the reels permits the winding reel or unwinding reel to be engaged by turning the crank in the same direction when the line is attached so that it feeds from both reels at either the top or bottom. By threading the line onto the reels so the line is taken on or off at the bottom of one reel and the top of the other reel, the crank will be turned in opposite directions for winding or unwinding the line. Of course, both reels may be locked together for winding and unwinding at the same time; however, when one reel becomes full of line and the other reel has most of the line removed, the slack causes the line to fall on the ground, providing an area of entanglement.

To use the decoy moving apparatus, push the legs of the winding mechanism into the ground or secure to a base. Take the end of a first line from one of the reels and thread it through the pulley of the anchor pulley and place shaft of the anchor pulley into the ground or anchor it in the water. Secure the end of the first line to the decoy base sled. Repeat the procedure with the second reel and second line. The shaft of the decoy mechanism can be moved back and forth to engage or disengage the first or second reel to determine the direction of movement of the decoy.

It is contemplated that a plurality of reels may be used in pairs to control additional decoy lines. The reels would be designated first reel, second reel, etc., starting from the position closest to the crank handle. As described heretofore, the preferred embodiment is using feed and take-up reels rotating in the same direction. The first reel disengages the opposing second reel so that the first reel of the engaged side is winding the string in while the opposing disengaged second reel free-wheels, "spinning freely on the sleeve," thereby releasing string from the spool as needed for movement of the decoy. In order to reverse the direction of the decoy, the shaft is moved through the sleeve or supporting means, by pulling or pushing, to disengage the engaged first reel and engage the prior disengaged second reel. The crank is then turned in the same direction so that the second reel is winding in the string and the first reel is unwinding string, thereby causing the decoy to pivot and move in the opposite direction. Moreover, the engagement mechanism allows the user to change the direction of movement of the decoy very quickly in order to make the decoy turn back and forth and "dance" in accordance with the desired method of enticing animals to the decoy.

The preferred embodiment of the winding mechanism comprises one or more pairs of reels or reels rotatably mounted on a single horizontal shaft; however, it is contemplated that the reels could be mounted on a vertical shaft as well, or one above the other on the same side of the frame support. Moreover, the reels of the preferred embodiment are round; however, it is contemplated that the reels could be formed in elliptical shape forming cams to vary the speed of movement of the decoy. A transmission such as a belt drive or gears may also be utilized to vary the speed of the decoy or provide greater power to pull heavy decoys.

A brake may also be used with the preferred embodiment by using a spring wrapped coaxially around the sleeve and engaging each reel with a slight tension to assist in control of the amount of string being reeled off of the freewheeling reel. The brake mechanism may also be mounted at any position between the reels by an arm or other support means just so long as the reels are engaged by the brake. Of course, other means of braking utilizing friction means on the reels or on the string being taken off of the reel can also be substituted for the braking system of the preferred embodiment.

An important feature is that the disengagement of the opposing reel allows the right amount of string to be removed from the pulley or reel, yet keep at least some tension on the string in order to keep the string from falling over the ground and becoming entangled or knotted and interfering with the movement of the decoy. The reels are not directly linked together mechanically as with gears because the amount of string on a full reel provides a circumference of a larger diameter than an almost empty reel, and would tend to cause the string to gather on the ground due to the difference in rate of rotation of the smaller reel in comparison with the larger reel.

Accordingly, it is an object of the present invention to provide a decoy moving apparatus utilizing a line of string or wire to pull a decoy or a decoy mounted onto a base.

Another important advantage and object of the present invention is to provide a decoy moving apparatus which is quiet.

Another object of the present invention is to provide a means of using as many anchor pulleys as desired in order to move the decoy in selected patterns, such as zigzag patterns.

It is another object of the present invention to provide each anchor with a pulley or loop in order that the decoy line is capable of moving back and forth between the winding mechanism and one or more anchor pulleys and that the decoy be pulled from the decoy winding apparatus to an anchor, or from one anchor to another anchor in a selected motion.

It is another object of the present invention to color or paint portions of the winding apparatus and/or decoy holding sled in a camouflage color.

Another important advantage and object of the present invention is that the decoy moving apparatus can be operated with one hand.

It is another object of the present invention to be able to place the anchor pulleys in position and to move the decoy around corners or objects which the user cannot see around, such as a large tree, bend of the road or over hills.

It is another object of the present invention to provide a decoy moving apparatus which can be used for moving targets in different locations, on land, in the water or even from a tree stand wherein the decoy can be suspended in the air, so that the user may operate the winding mechanism from a convenient vantage point behind objects, in a tree stand or from the bank of a body of water.

It is another object of the present invention to provide for using a scent, or taped sound device, or mouth calls in combination with the decoy moving apparatus.

It is another object to provide a decoy moving apparatus which is compact enough to fit into a backpack or bag.

It is yet another object of the present invention to provide a winding apparatus whereby the decoy can be pulled to or away from the frame of the winding apparatus while cranking in a single direction by using a shaft/reel engaging/disengaging mechanism.

It is yet another object of the present invention to provide a base forming a sled.

It is another object of the present invention to provide a winding mechanism comprising a pair of reels independently rotatably engaged with a manual crank.

It is another object of the present invention to provide a means of energizing the reels of the winding mechanism using a motor powered by a battery or electric motor.

It is another object of the present invention to utilize line selected from the group consisting of clear fishing line, nylon, cotton cord, string, metal wire and cable, or other polymers.

It is another object of the present invention to utilize clear line for deer, crows, owl, ducks and geese.

It is another object of the present invention to provide a method for the user to rotate the decoy and change the direction of movement of the decoy very quickly in order to make the decoy turn back and forth and "dance" in accordance with the desired method of enticing animals to the decoy.

It is another object of the present invention to provide a decoy moving apparatus which cannot only be used when hunting or observing wildlife, but also used in other manners such as providing a tool for target practice of various types.

Finally, it is an object of the present invention to provide a support means for the decoys mounted onto the base sled whereby different types of decoys may be utilized with the sled.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 14 is a plan view of a crank handle and shaft showing the reel engaging pins;

FIG. 15 is a shaft sleeve for supporting the shaft therethrough and reels thereon;

FIG. 17 is a perspective side view showing an alternate embodiment of the decoy sled base showing the means for holding formed extending uniformly across the top surface of the sled and having a recessed area to accommodate the line holding means;

FIG. 22 is a schematic representation showing the winding mechanism connected to a single anchor pulley for moving a decoy back and forth in between;

FIG. 23 is a schematic representation showing the winding mechanism connected to a pair of spaced apart anchor pulleys for moving one or more decoys back and forth in between wherein the decoys are floating on water and the anchors are weights attached to immovable decoys and moveable decoys are pulled back and forth in between the anchored decoys to the winding mechanism;

FIG. 24 is a schematic representation showing the decoy moving between a pair of anchor pulleys from the first reel to the second reel of the winding mechanism;

FIG. 25 is a schematic representation showing a different pattern or path of the decoy layout;

FIG. 26 is a schematic representation showing a plurality of decoys moving between a plurality of anchor pulleys from the first reel to the second reel of the winding mechanism;

FIG. 27 is a schematic representation showing a different pattern or path of the decoy layout of the decoys of FIG. 26;

FIG. 28 shows a claw anchor pulley for use with the present invention;

FIG. 29 shows a top view of the decoy sled having partitions formed for holding weights therein;

FIG. 30 is a front view of the sled mounting base;

FIG. 31 is a side view of the sled mounting base; and

DETAILED DESCRIPTION OF THE PREFERRED EMBODIMENT

The decoy base and winding apparatus 10 of the present invention is manufactured from readily available materials and simple in design. The preferred embodiment is comprised of metal, more particularly steel; however, it is contemplated that aluminum, wood, fiberglass, plastic, polymer composite materials or combinations thereof could be used in combination with or substituted for the steel components of the present invention.

Figure 18:
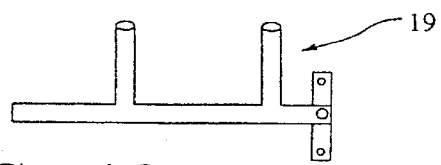
FIG. 18 is a base mounting unit for the frame of the winding mechanism shown in FIG. 1 providing means for rotatably mounting the unit on a hard surface such as a tree stand.

Referring now to the drawings, FIGS. 1–11 show the decoy moving winding and unwinding apparatus 10 comprising a frame 12 which is typically composed of a one or more vertical tubular members which can be pushed into the ground or mounted from a base. The frame 12 of the preferred embodiment utilizes a first front leg 14 vertical tubular member and a second rear leg 16 as a vertical tubular member. The distal ends 18 of the first leg 14 and second leg 16 are pointed to facilitate easy insertion into the ground or for cooperative engagement into a holding member 19 such as shown in FIG. 18. The frame 12 of the preferred embodiment utilizes three cross members for stability. The first cross member 20 connects the first leg 14 and second leg 16 together near the central area of the frame 12. The second cross member 22 is located between the first cross member for providing lateral stability and supporting a reel holding means, and a third top is cross member 24 which is often formed in a shape having a generally flattened appearance to provide a good grip of carrying and a smooth surface for pushing the legs 14, 16, into the ground.

As shown in FIG. 18, a winding apparatus mounting base 19 may be attached to fixed objects such as a tree stand for support thereof. The base includes a longitudinal member for attachment to a surface having cylinders extending upward therefrom sized for and spaced apart for cooperative engagement with the legs of the winding apparatus. A cross member may be attached to one end of the longitudinal support member by a pin providing a pivoting point and additional vertical stability therefor.

A pair of reels 36, 38 are formed having flat sidewalls; however, the sidewalls may be formed curving outwardly toward the outer edge to guide the line 48 into the reel 36, 38. It is contemplated that additional reels may be added and operated with the same crank to move additional decoys 86.

The reel holding means is supported on and normal to the second cross member 22. The reel holding means in the preferred embodiment is a horizontal tubular member or sleeve 26; however, it is contemplated that rings, loops, or one or more sections of tubing could be utilized therefore. Within the sleeve 26 is a shaft or axle 28 rotatably supporting at least a first takeoff reel 36 and at least a second takeon reel 38. Washers 34 positioned on each side of the reels 36, 38 are held in place by means for holding such as retainer rings or spring clips 54 which may engage a groove 52 as shown in FIG. 15. Thus, the reels 36, 38 are held in position upon the sleeve 26 by the spring clips 54.

In the preferred embodiment the shaft 28 cooperatively engages both reels 36, 38 separated by the frame 12 and supported within the sleeve 26 mounted horizontally to the frame 12. A means for rotating the first reel 36 and said second reel 38 consists of a hand crank having a handle 30. A small electric motor 39 powered by electricity or batteries could also be utilized for power to rotate the reels 36, 38 (see FIG. 6). Moreover, a remote control unit could be used to actuate the electric motor and provide forward motion, reverse motion, and variable speed. It is also contemplated that a worm gear assembly could be mounted onto the frame so that a shaft 28 aligned normal to the reels 36, 38 and powered by hand or an electric motor could be used to rotate the reels 36, 38 so that the crank can be positioned behind the reels 36, 38 rather than extending from the side as shown in the preferred embodiments.

Means for guiding the line 48 comprising loops 46 extend from the frame 12 normal thereto in front of and in alignment with each of the reels 36 and 38. The loops 46 shown in the figures extend outwardly from horizontal arms 44 affixed to the sides of the frame 12 at a selected position; however, the loops may be removably attached to the frame 12 or rotatably and/or slidably attached thereto for adjustment. Typically the loops 46 are mounted near the top or bottom of the reels 36, 38 depending upon the point of takeon or takeoff of the line 48.

In the preferred embodiments the reels 36, 38 may be turned in the same direction at the same time or in an opposite direction independent of one another depending upon whether the line is wrapped on the reels 36, 38 clockwise or counterclockwise. The line 48 may be attached to the first reel 36 and second reel 38 so that the line 48 feeds, and takes off, from the bottom of the reels 36, 38 so that the crank handle 30 is turned in the same direction when feeding and winding the line 48. The line 48 may be fed at the top of one reel and taken up at the bottom of the other reel whereby the crank handle 30 may be rotated in opposite directions depending upon which direction the decoy is moved back and forth.

Figure 2:
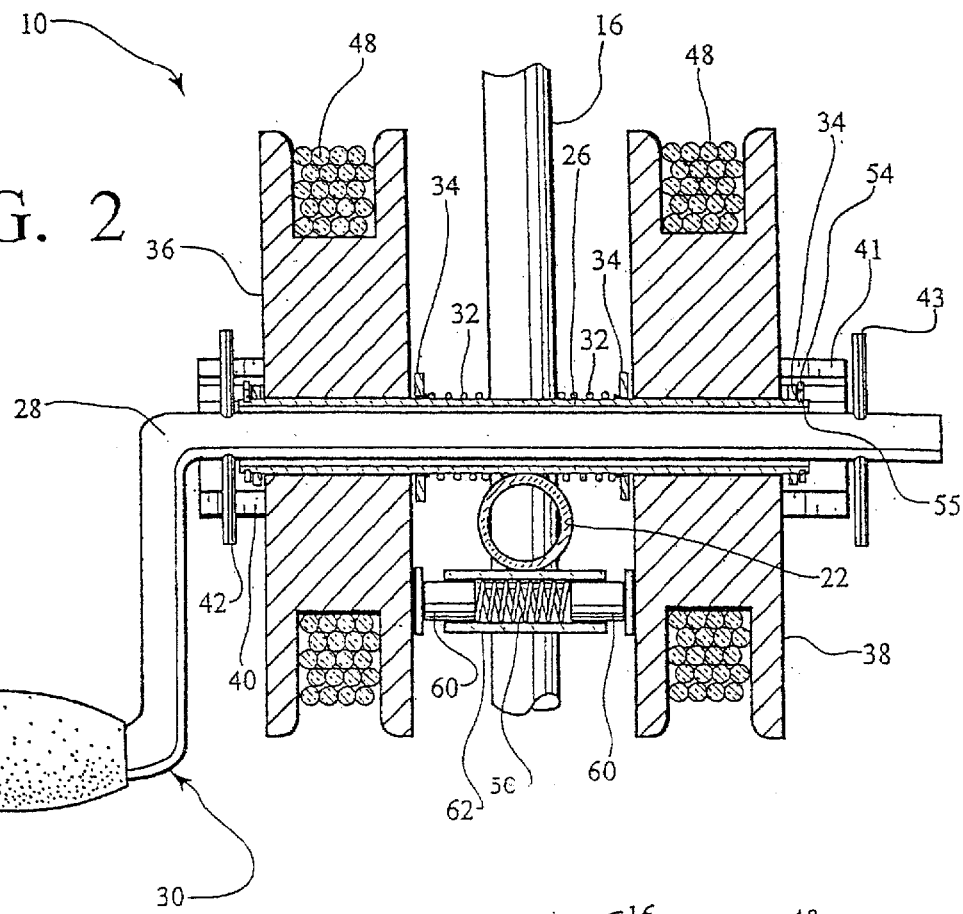
FIG. 2 is a cross-sectional view of FIG. 1 along line 1—1 showing the sleeve, reels, shaft, spring brake, shaft tension spring and frame, wherein the first reel is engaged and the second reel is disengaged and free wheeling.
Figure 13:
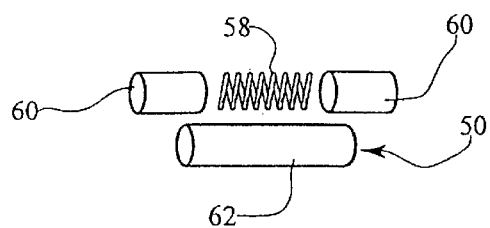
FIG. 13 is an exploded view of a spring brake.
Figure 16:
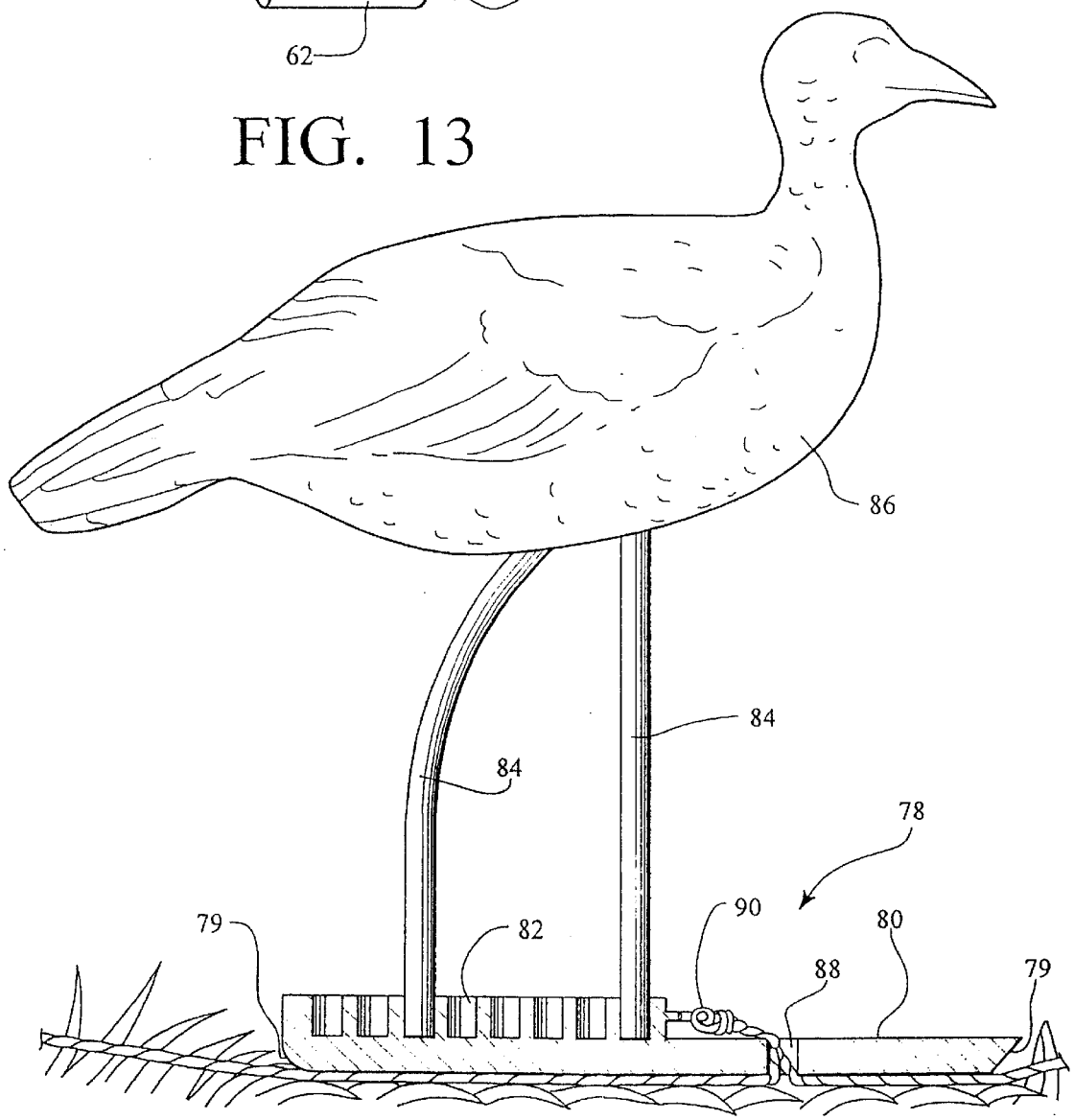
FIG. 16 is a perspective side view showing a decoy mounted onto a sled base having a plurality of positioning points therein.

A means for biasing and applying tension on one or both of reels 36, 38 provides a means to control free-wheeling of the unengaged reel 36, 38. As shown best in FIGS. 2 and 3, the biasing means may comprise a spring brake 50 as shown in FIGS. 2 and 13. The spring brake 50 comprises a tubular longitudinal member 62 having a spring 58 inserted within and a pair of spacer means such as cylindrical sections 60 having end surfaces which abut the distal ends of the spring 58. The length of the spring brake 50 and tension of the spring 58 are designed positioning between the reels 36 and 38 in order to provide slight pressure thereto and limit the amount of free-wheeling of one or both reels 36 and 38.

Figure 1:
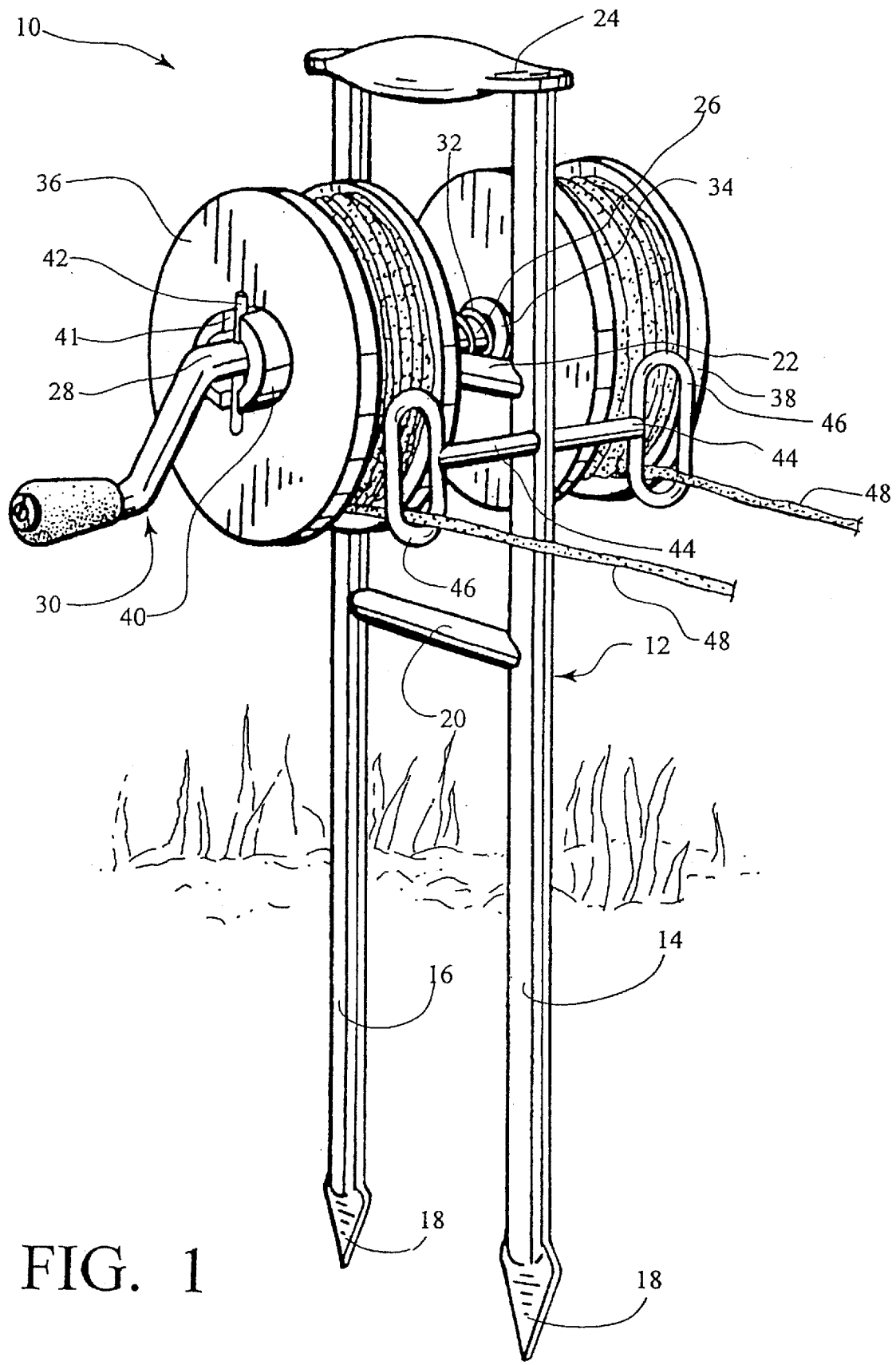
FIG. 1 is a perspective view of the winding mechanism of the present invention showing a pair of reels mounted to a shaft of a support frame wherein the reels are engaged and rotated in the same direction independently by a hand crank, and showing a line wrapped around the reels in the same direction and through the guide eyelets with a shaft tension spring exerting light pressure on the reels.

As shown in FIGS. 1 and 2, an alternate means of exerting tension and limiting free-wheeling of one or both of the reels 36, 38 is to insert a tension spring 32 coaxially around the shaft 26 and in between the washer 34 and the second cross member 22 so that the tension spring 32 abuts the frame 12 and side of the reels 36, 38.

It should be noted that neither the tension spring 32 nor the spring brake 50 are required for operation of the present invention and that the invention may be used with a tension spring 32, a spring brake 50, or combination thereof.

Figure 3:
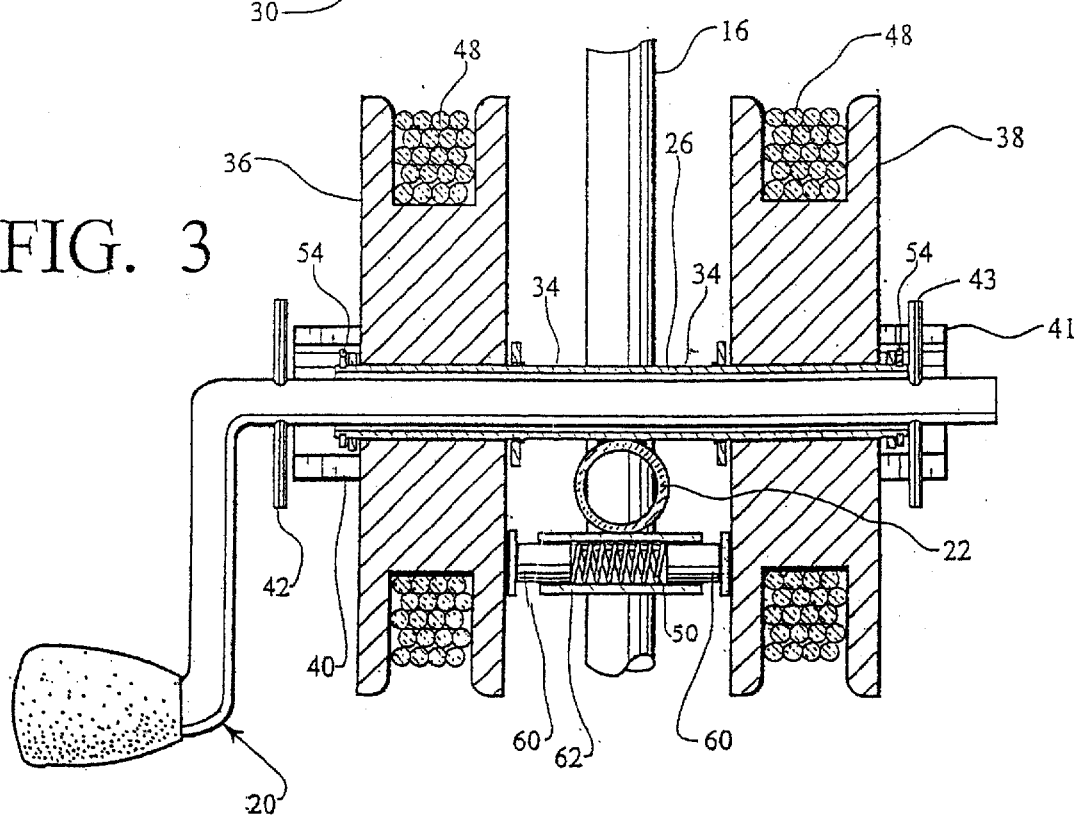
FIG. 3 is a cross-sectional view of FIG. 1 along line 1—1 showing the sleeve, reels, shaft, spring brake and frame, wherein the first reel is disengaged and free wheeling and the second reel is engaged.
Figure 4:
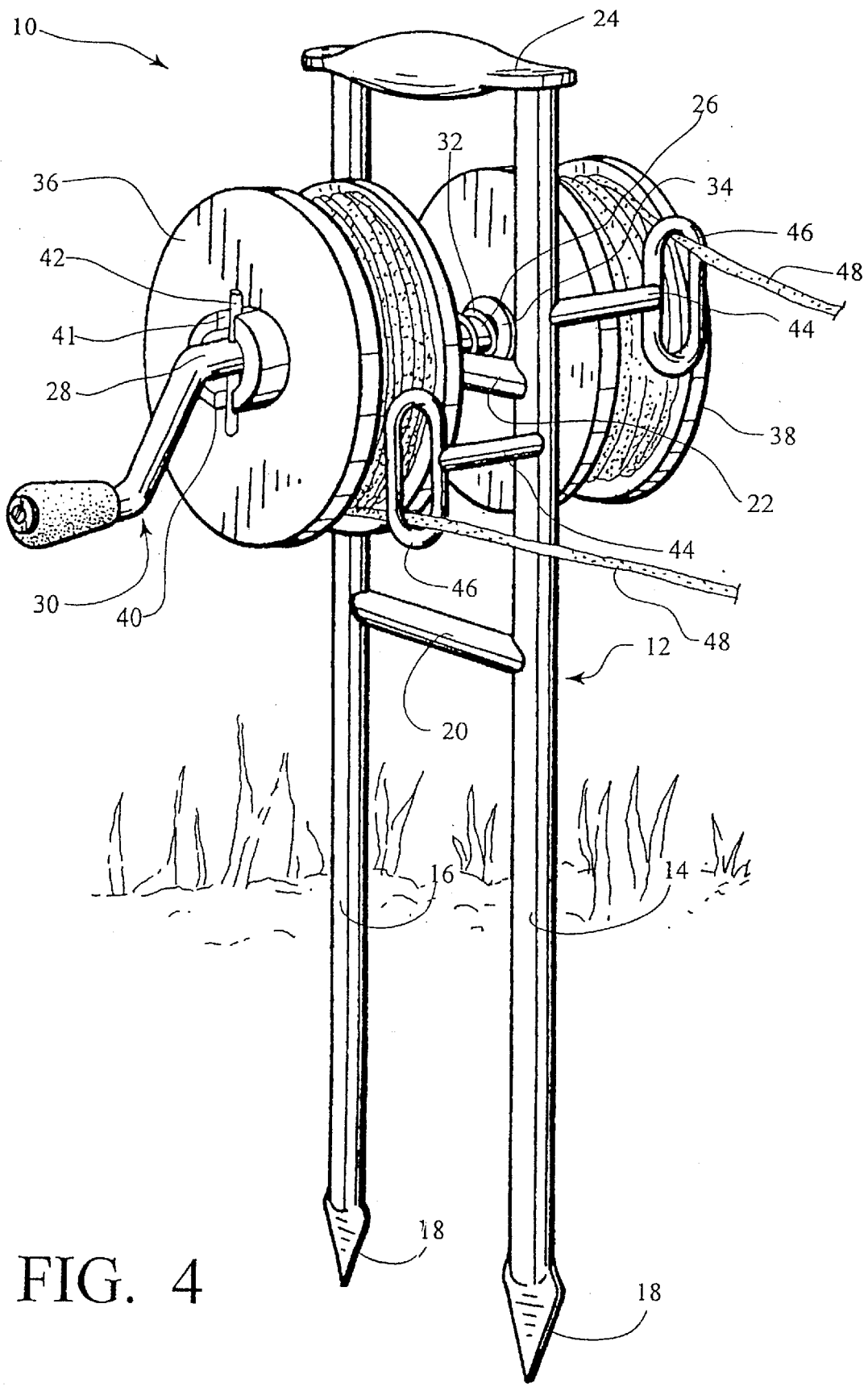
FIG. 4 is a perspective view of the winding mechanism of an alternate embodiment of the present invention showing a pair of reels mounted to a shaft of a support frame wherein the reels are engaged and rotated in the opposite direction independently by a hand crank, and showing a line wrapped around the reels in opposite directions and through the guide eyelets with a shaft tension spring exerting light pressure on the reels.
Figure 5:
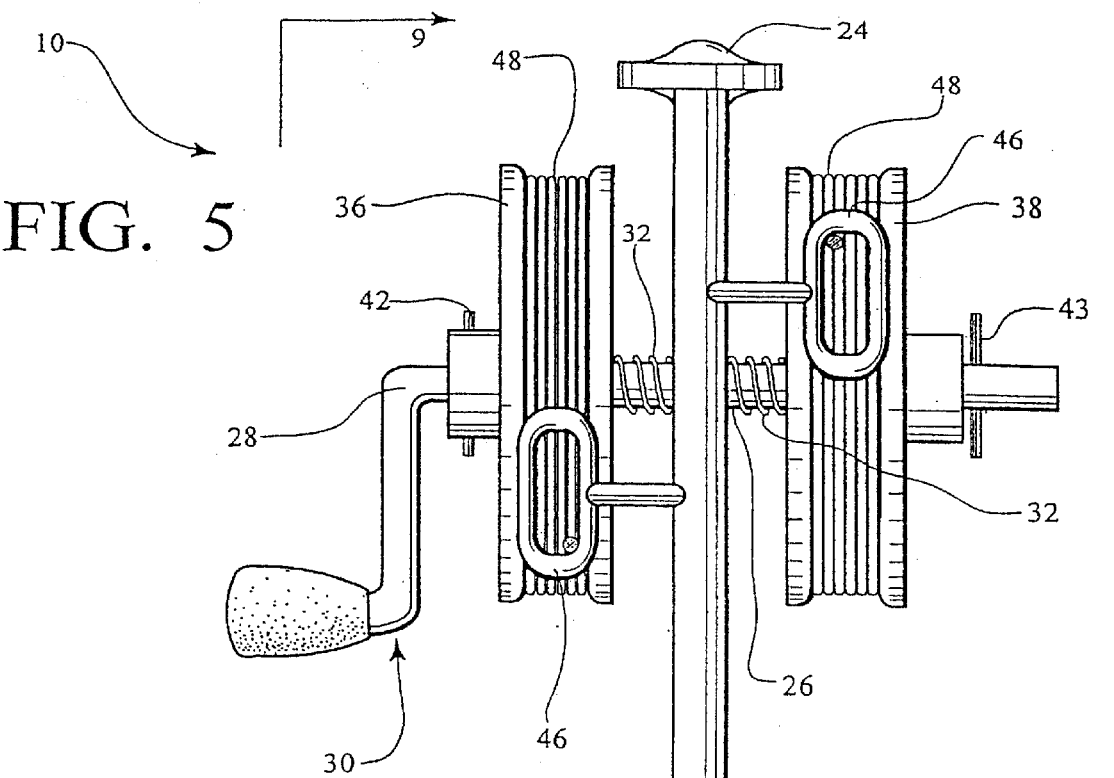
FIG. 5 is a front view of FIG. 4 showing the shaft tension springs.
Figure 6:
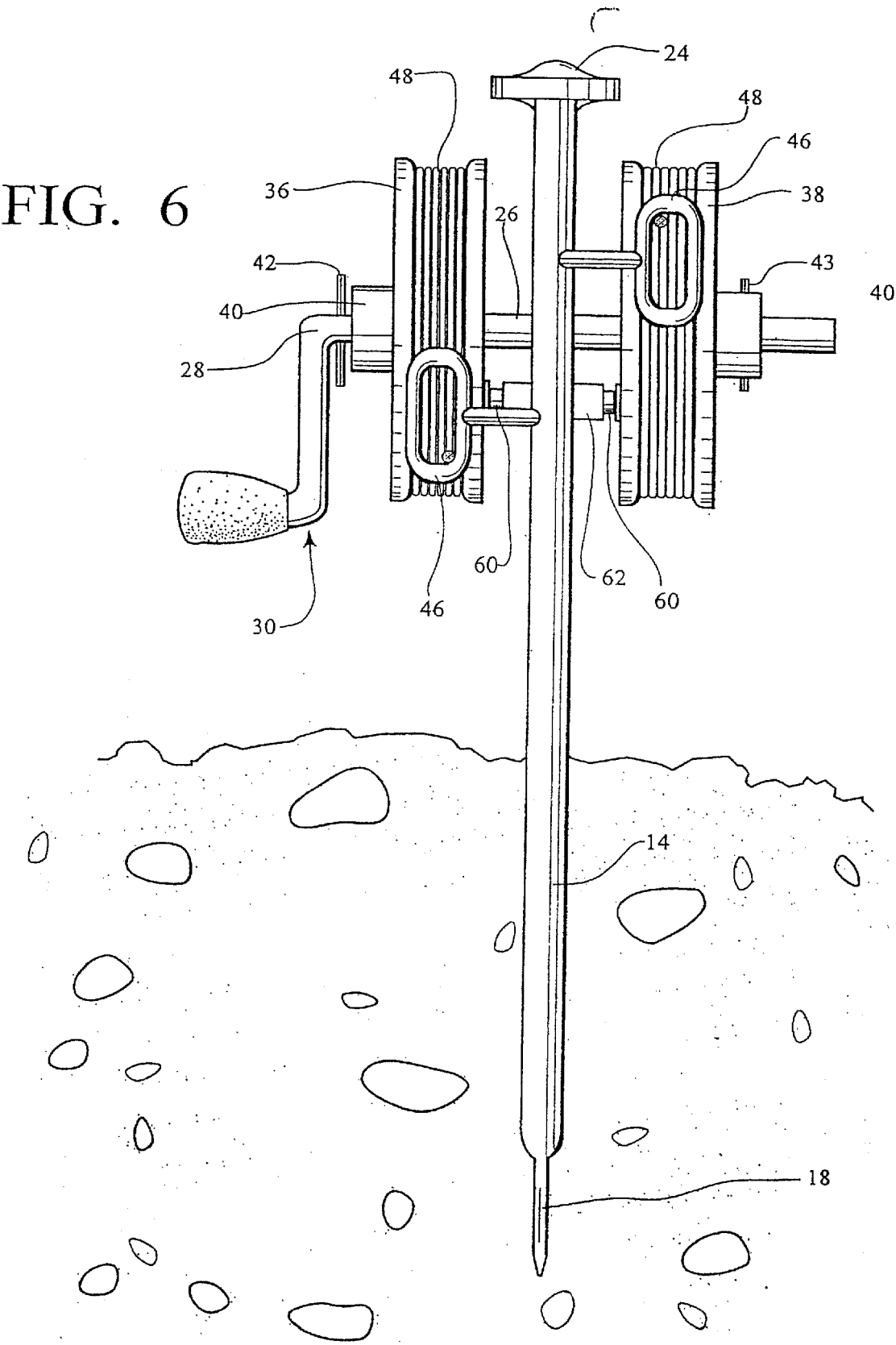
FIG. 6 is a front view of FIG. 4 showing the shaft tension springs replaced by a spring brake.
Figure 7:
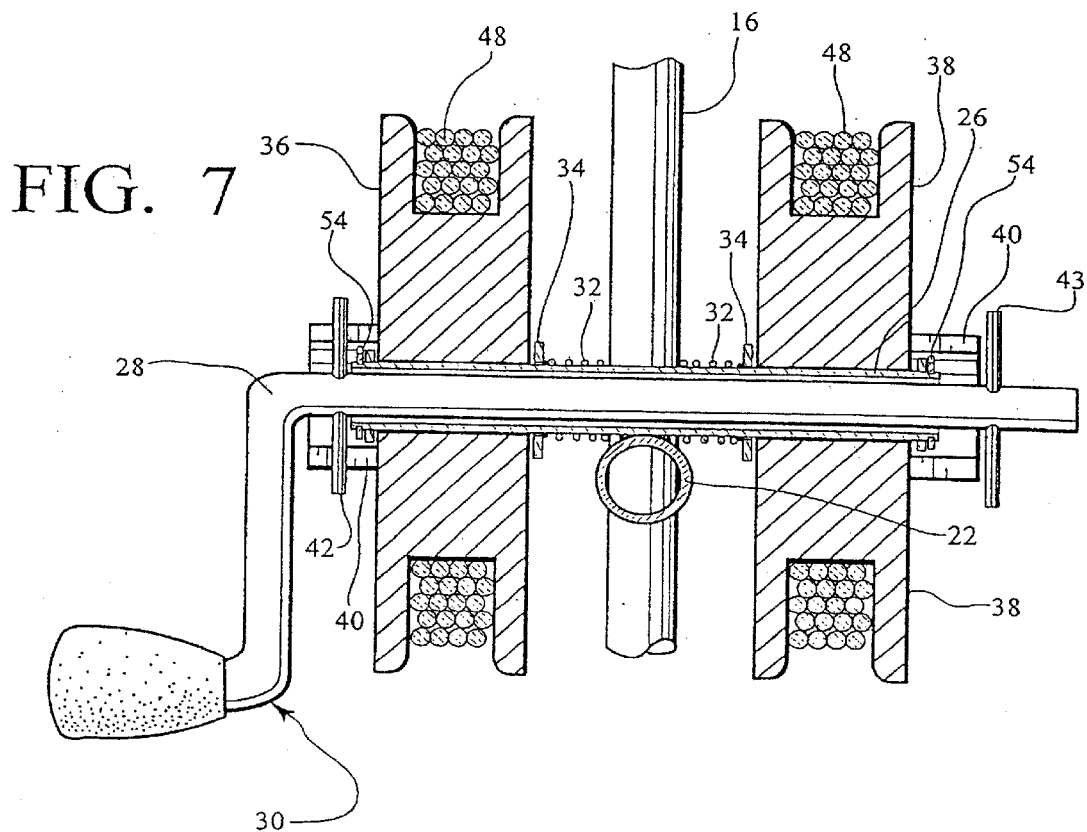
FIG. 7 is a cross-sectional view of FIG. 5 along lines 5—5 showing the sleeve, reels, shaft, shaft tension spring and frame, wherein the first reel is engaged and the second reel is disengaged and free wheeling.
Figure 8:
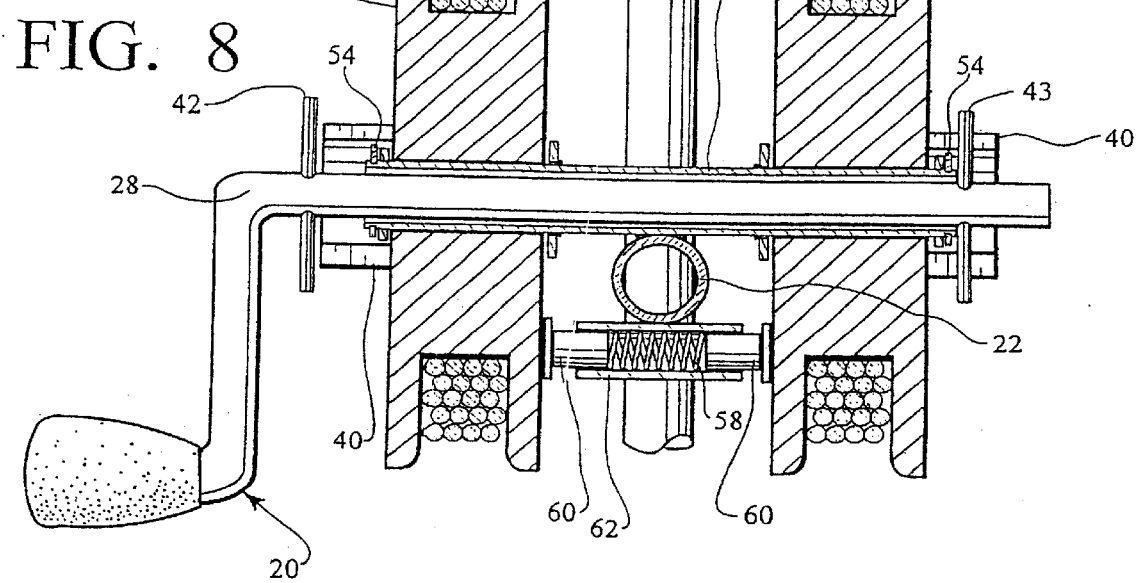
FIG. 8 is a cross-sectional view of FIG. 6 along lines 6—6 showing the sleeve, reels, shaft, spring brake and frame, wherein the first reel is disengaged and free wheeling and the second reel is engaged.
Figure 9:
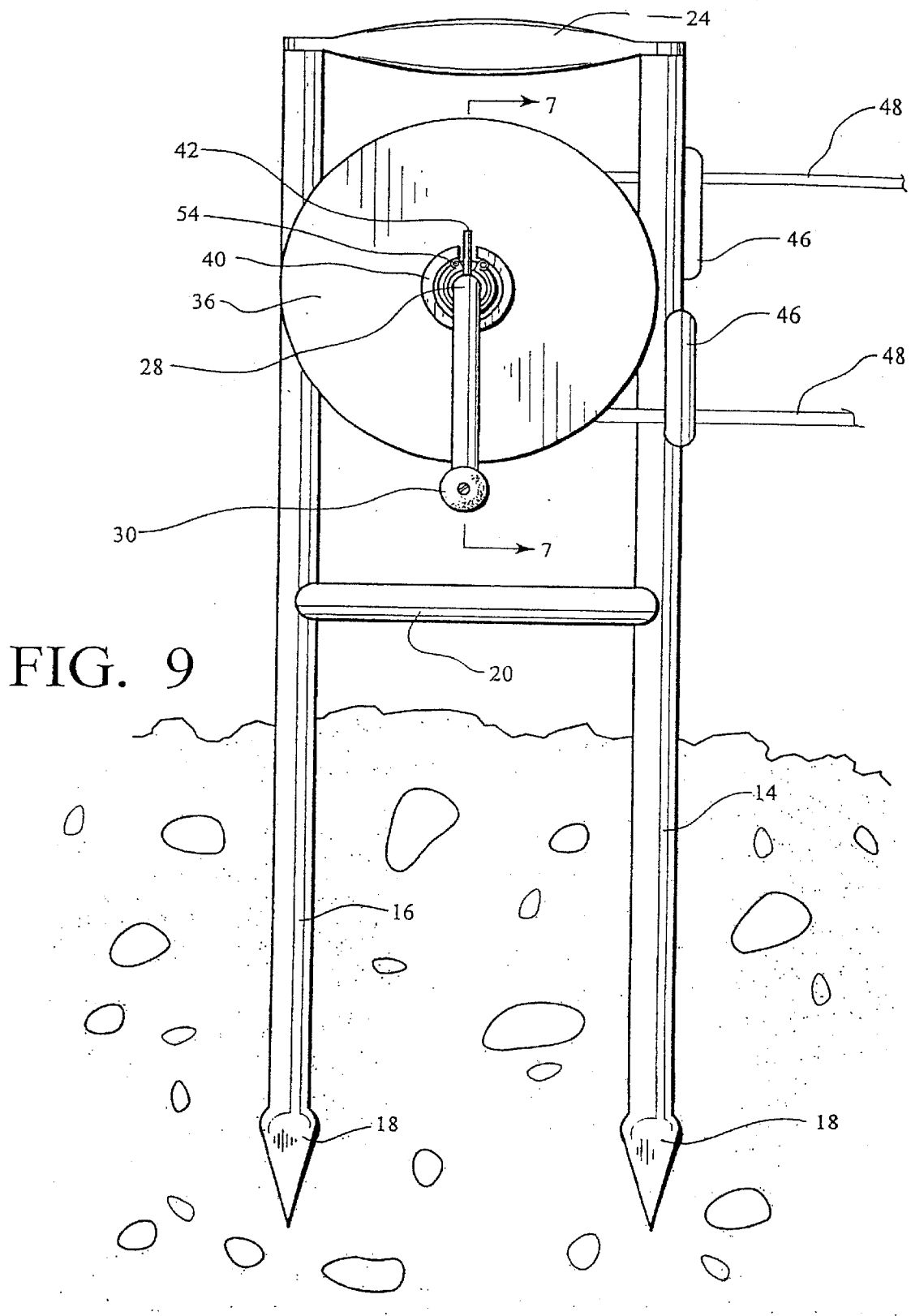
FIG. 9 is a left-side view of FIG. 4.
Figure 10:
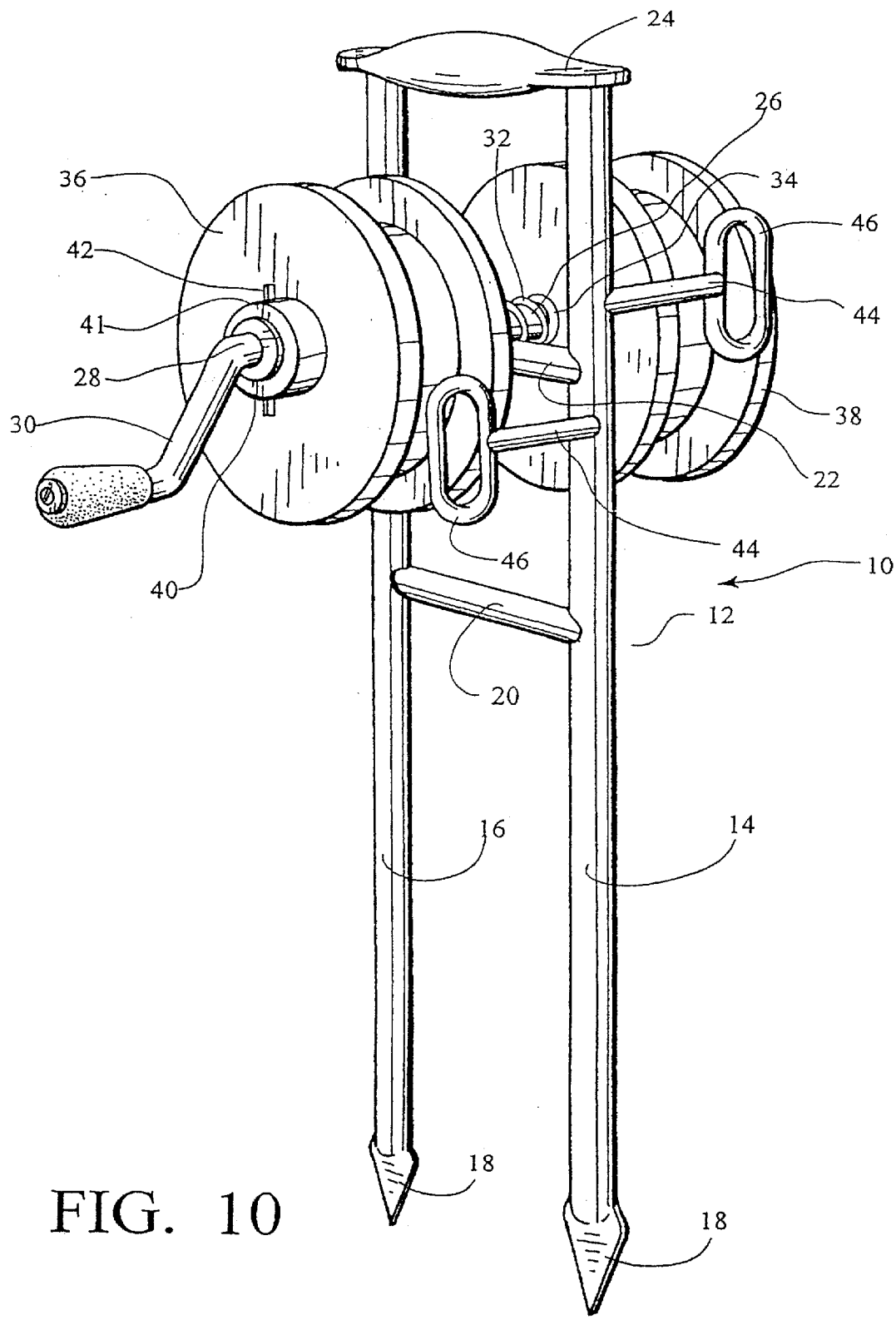
FIG. 10 is a perspective view of an alternate embodiment wherein both of the reels are engaged at the same time for unwinding and winding the line.

As shown in FIGS. 1–3, the winding apparatus utilizes a shaft 28 of a length sufficient to extend outwardly past the end of the reel 36, 38 whereby the reels 36, 38 rotate about and slide along the shaft 28. The shaft 28 slides back and forth to engage and disengage opposite reels, 38 making disengaged reel 36, 38 free wheeling. The washer 34 of the reel 36, 38 abut the frame to limit lateral movement inwardly and the pins 42 limit lateral movement of the reels 36, 38 outwardly. As shown best in FIG. 14, a first pin 42 extends through the shaft 28 on the proximal end of the shaft 28 end near the crank handle 30 and is slidably engageable with a first ring coupling member 40 having a groove or notch 41 formed in the outer surface thereof opposite the reel 36, 38. The ring coupling member 40 may be formed integrally with the reel or it may abut and be affixed to the outer wall of the reel 36, 38. A second ring coupling member 40 is positioned against the exterior wall of the opposing reel 38 extending outwardly having a cooperative groove and second pin 43 extending through the shaft 28 at the distal end thereof. As shown in FIGS. 7 and 8, the pins 42, 43 are spaced apart from one another and the reels 36, 38 so that when the shaft 28 is pushed inwardly toward the second reel 38, the first pin 42 cooperatively engages the first ring coupling member 40 and the first reel 36. When the shaft 28 is pulled out toward the crank 30 the first pin 42 is disengaged from the first ring coupling 40 and the second pin 43 is pulled into and cooperatively engages the second ring coupling 40 or the second reel 38.

Figure 11:
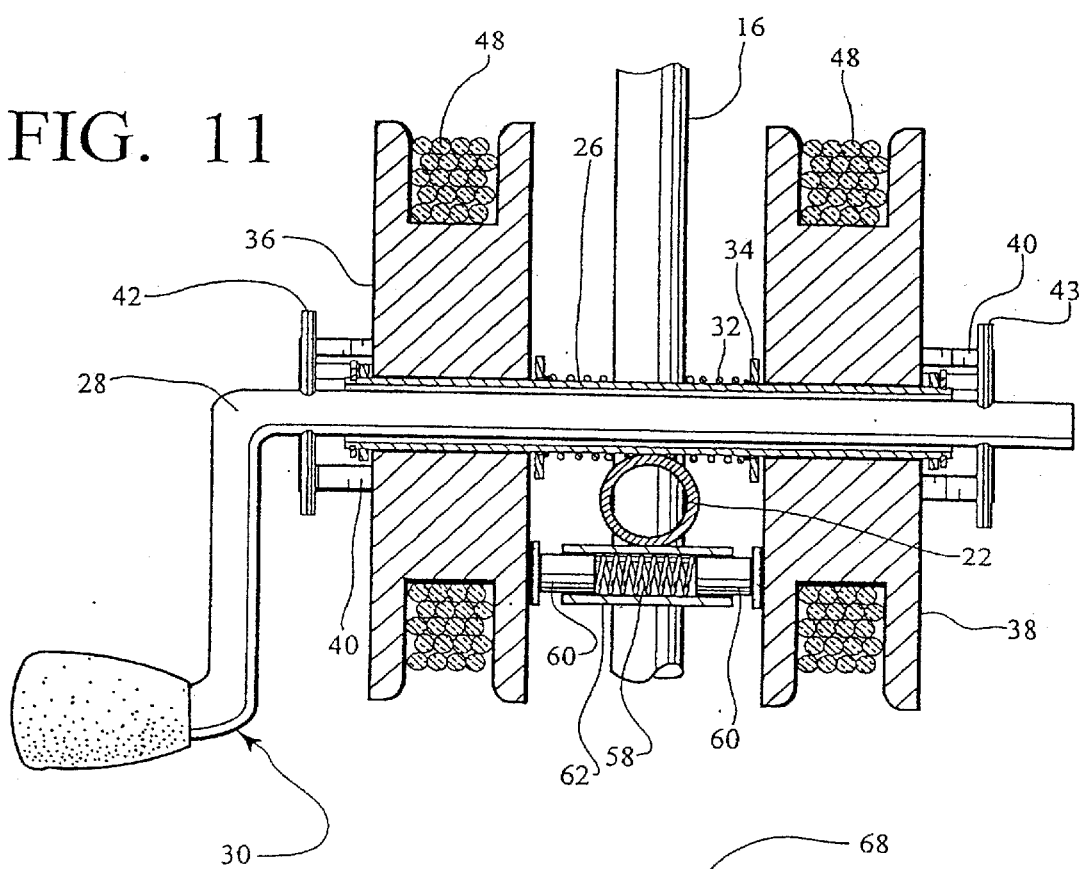
FIG. 11 is a cross-sectional view of FIG. 10 along lines 10—10 showing the sleeve, reels, shaft, spring brake, shaft tension spring, frame and locking pins extending through and engaging both reels.

As shown in FIG. 11, the first pin 42 and second pin 43 are spaced to engage the first ring coupling member and the second ring coupling member simultaneously providing a means for feeding line 48 and taking up line 48. This arrangement tends to produce slack line which gathers on the ground depending upon the amount of line used due to the change of circumference of the line 48 remaining on the reels 36, 38.

Figure 12:
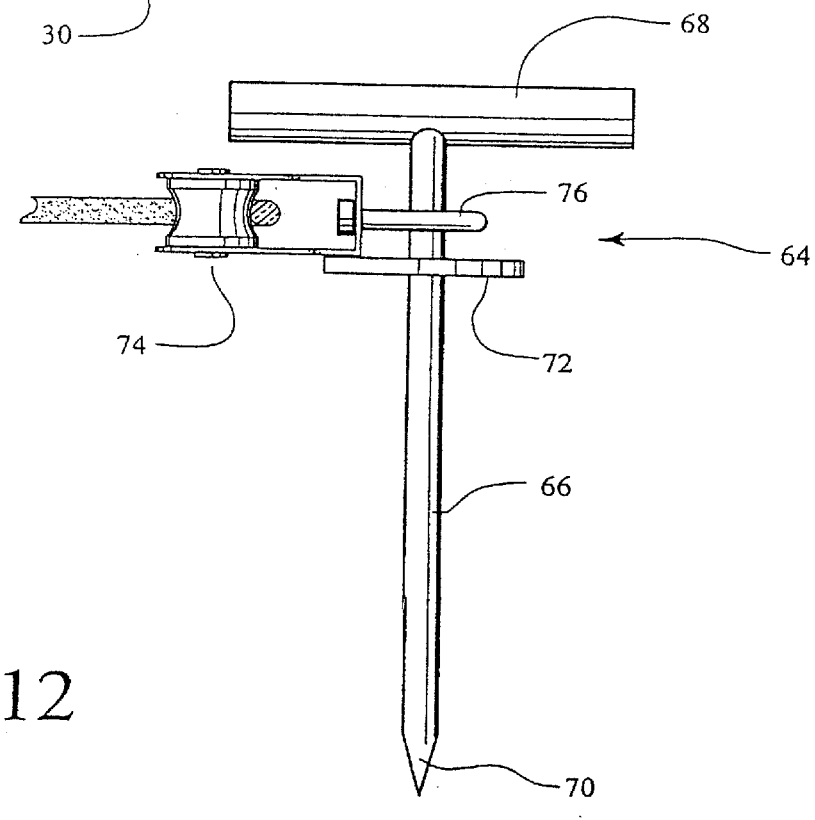
FIG. 12 is a perspective view of an anchor pin and pulley for use with the invention.

FIG. 12 shows a typical anchor pin 64 consisting of a spike 66 having a cross member 68 forming a handle attached to the distal end opposite the point 70. One or more spacer members 72 such as a washer are securely positioned at a selected point to provide the desired ground clearance. A pulley 74 is attached to the anchor pin 64 by a hook 76 or other means. The spike 66 of the preferred anchor pin 64 is comprised of metal; however, other durable materials may be used as well. The spike 66 may also be formed having flights or formed in corkscrew shape to facilitate placement into the ground. It is contemplated that other types of anchor devises may be used with the present invention.

Of course the line 48 could be mounted to a tree, rock or other immovable object depending on the terrain and type of movement desired for the decoy 86. In a water environment, the line is connected to an anchor decoy or other camouflaged object which may be anchored by a weight or holding means so that the decoy 86 can be moved to the anchor decoy back and forth between the first and second reel, 36 and 38, respectively.

"U-shaped" members may be placed into the ground at various points to aid in holding the line close to the ground in uneven terrain.

Figure 19:
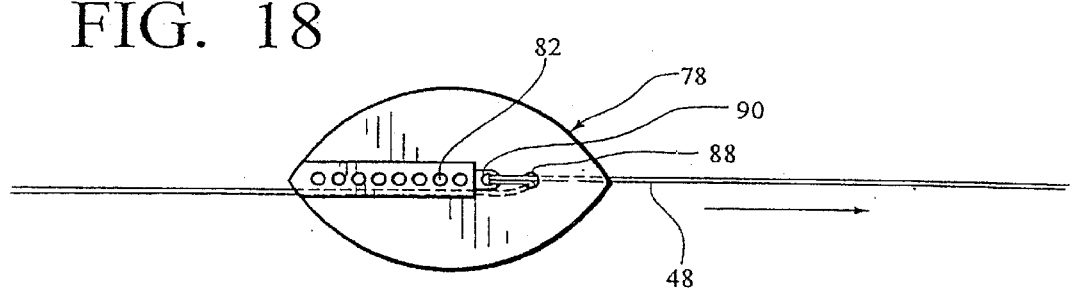
FIG. 19 shows the decoy sled base being pulled along a path from left to right.
Figure 20:
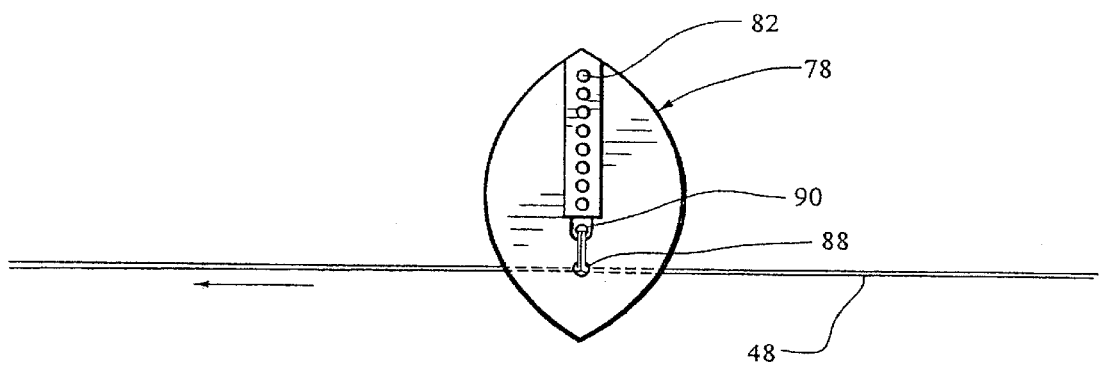
FIG. 20 shows the decoy sled base being rotated at a right angle with respect to the path of travel.
Figure 21:
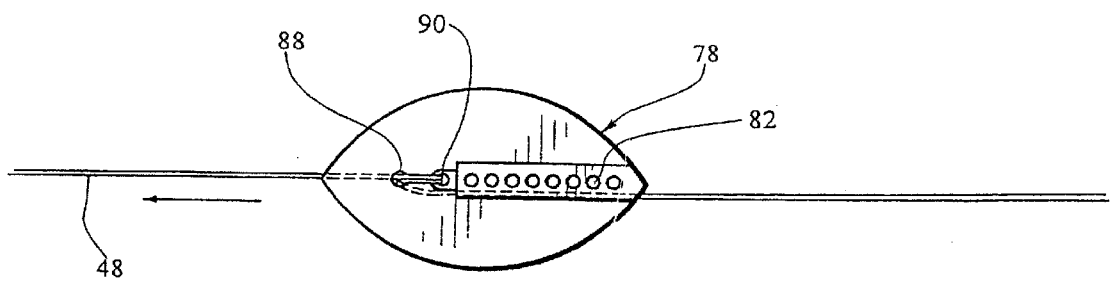
FIG. 21 shows the decoy turned around 180 degrees for movement in the opposite direction.
Figure 32:
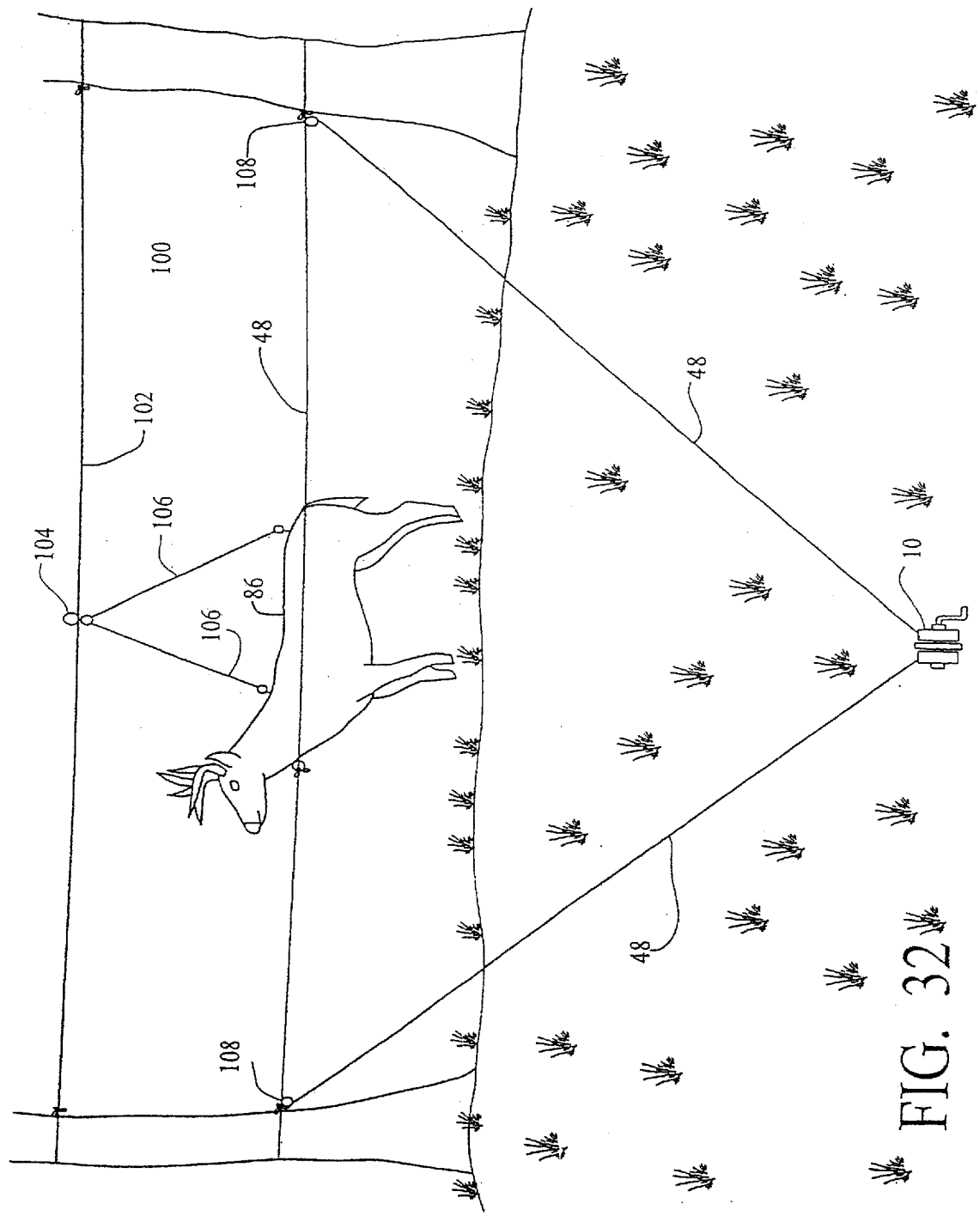
FIG. 32 shows an overhead support assembly.

FIGS. 16, 17 and 29–31 show a movable decoy mounting base 19 for use with the winding apparatus 10. The preferred embodiment comprises a sled 78, which is oval in shape and substantially flat. The side edges 79 are angled upwardly to facilitate sliding over grass or irregularities of the ground surface. The upper surface 80 includes at least one and preferably a plurality of apertures 82 extending a selected distance into the base surface 80 for cooperatively engage one or more holding members or legs 84 of the decoy 86. Usually two legs 84 are used to prevent rotation of the decoy 86; however, on leg 84 may be used if fastened securely into the aperture 82 or if the aperture is formed having a cross-sectional having a particular shape being square, octagon, etc.. In the preferred embodiment, a hole 88 is formed at a selected location in the sled 78 spaced apart from the front, back, or center points so that the line 48 is run in-under the sled 78 and extends upwardly through the surface 80 where it is tied to an eyelet 90. In the preferred embodiment the eyelet 90 is formed in a recessed area of the sled 78 to maintain a low center of gravity and be less noticeable. As shown in FIG. 29 the sled may include webbing to increase strength and reduce weight and provide a section to hold weights 92. As shown in FIGS. 19–21, the position of the hole 88 provides a means for the user to control the pivoting of the decoy 86 with the winding device 10.

The movable decoy mounting base or sled 74 of the preferred embodiment is fabricated in various sizes depending upon the size and weight of the decoy 86 to be supported thereon. For instance, a 12 inch by 18 inch sled can be used for lightweight decoys 86 consisting of polyurethane foam, styroforma, plastic, or shell type decoy animals such as turkeys, geese, ducks, rabbits, or fawn deer. Larger sleds 74 of approximately 24 inches by 30 inches are used for coyotes, adult deer, moose, or elk. It is contemplated that the decoys 86 may be integrally formed having a sled base of runners thereon or that a cart supported by wheels or rollers could by utilized as a movable decoy base. Weights may be used on the sled or formed integrally therewith to provide a stable base for large or heavy decoys in adverse environmental conditions.

FIGS. 22–27 illustrate various schematic representations using the sled 78 and winding apparatus 10 of the present invention. FIG. 22 is a schematic representation showing the winding mechanism 10 connected to a single anchor pulley 64 for moving a decoy 86 back and forth thereinbetween. FIG. 23 is a schematic representation showing the winding mechanism 10 connected to a pair of spaced apart decoy anchor pulleys 65 for moving one or more decoys 86 back and forth thereinbetween wherein the decoys 86 are floating on water and the decoy anchor pulleys 65 consists of immovable decoy anchor pulley 65 having weights attached thereto whereby movable decoys 86 are pulled back and forth in between the decoy anchor pulleys 65 to the winding mechanism 10. FIG. 24 is a schematic representation showing the decoy 86 moving between a pair of anchor pulleys 64 from the first reel 36 to the second reel 38 of the winding mechanism 10. FIG. 25 is a schematic representation showing another triangular pattern or path of the decoy 86 path. FIG. 26 is a schematic representation showing a plurality of decoys 86 moving between a plurality of anchor pulleys 64 from the first reel 36 to the second reel 38 of the winding mechanism 10 in a diamond pattern. FIG. 27 is a schematic representation showing a different decoy layout wherein the decoys 86 are traveling in a row.

As shown in FIG. 28, a claw anchor pulley 94 includes a shaft having a first end connected to an anchor pulley and a second end connected to a cross member extending outwardly on both sides therefrom wherein the distal ends of the cross member are connected normal to hook members formed having a bend at about a right angle. The string can be threaded through the reel of the claw anchor pulley which van be thrown from a concealed position near the animal to be attached so that decoy can be moved between claw anchor pulley and the first and second reels 36, 38.

An overhead support cable system 100 attached to stationary objects may also be used to support large animal decoys and used in combination with the decoy moving winding apparatus 10 of the present invention. A first top line 102 supports a swivel pulley 104 having one or more decoy suspension lines 106 attached to the decoy 86. The line 48 from the winding apparatus 10 is anchored to the stationary objects by pulleys 108. The line 48 is fastened to an eyelet or other holding means on the decoy 86 to provide the means for moving the decoy 86 between the stationary objects.

Figure 33:
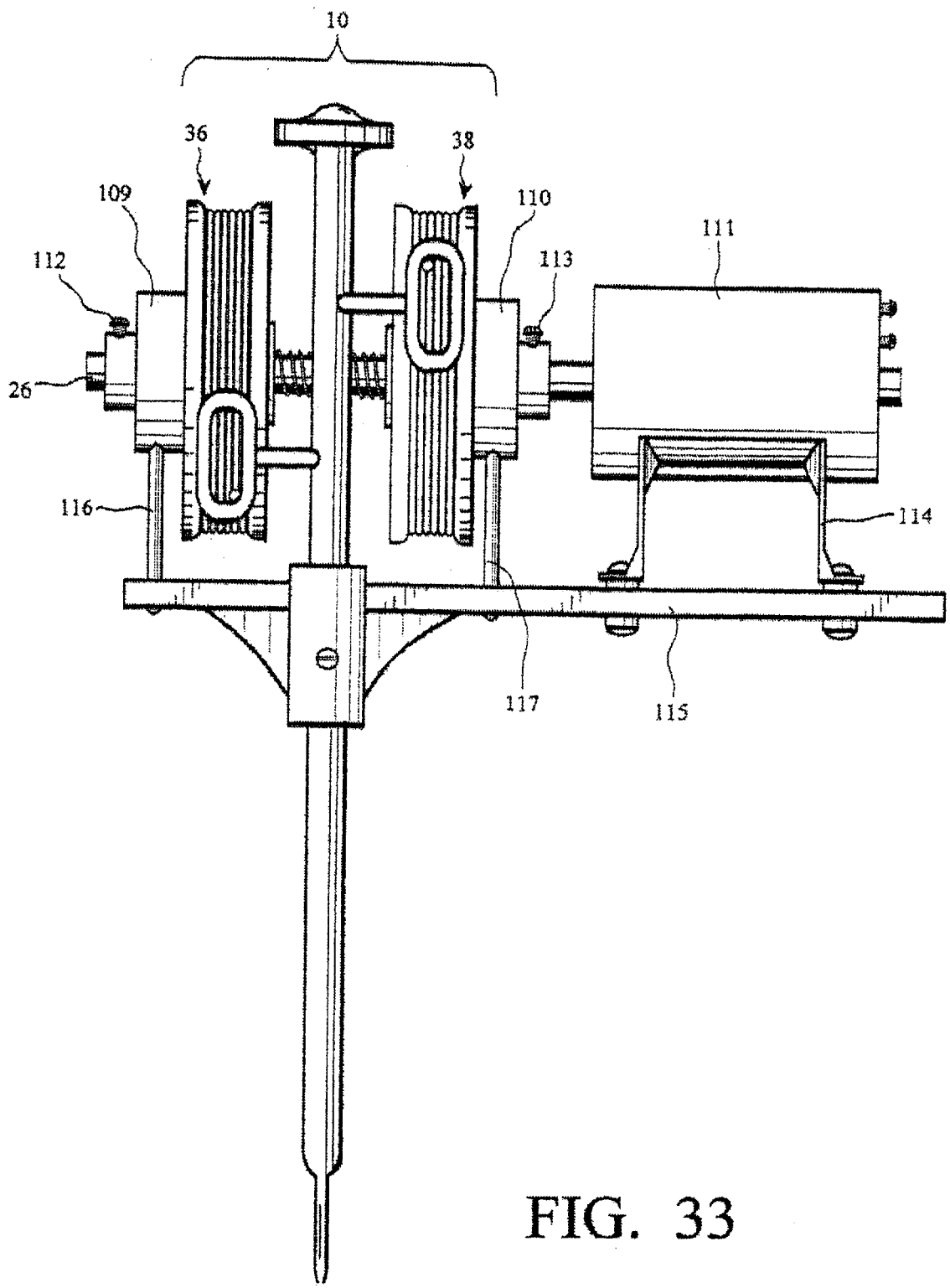
FIG. 33 is a front view of the winding mechanism of an alternate embodiment of the present invention showing a pair of reels mounted on the shaft of a support frame with a clutch attached to each reel, also mounted on the shaft and a reversible motor mounted to the shaft and supported by an adapter plate also attached to a support frame.

FIG. 33 is a frontal view of an alternative embodiment of the present invention. In this Figure, attached to the first reel 36 and second reel 38 are coupling/decoupling clutches 109, 110 and a reversible motor 111. Clutches are utilized to transfer the rotational drive of the drive shaft to the reels. Since the reels will be potentially at rest while the drive shaft has a significant rotational velocity, a clutch device is necessary to provide a smooth transition to bring the reels to the same speed as the input shaft. Thus, when the reels are brought up to speed of the drive shaft, the clutch is utilized to transfer energy from the shaft to the reels. As the reels are brought up to speed, slipping must occur until the reels have the same rotational speed as the drive shaft. Kinetic energy is thus absorbed by the clutch systems and released as slight heat when the clutch is engaged to fully rotate the reels. Either frictional contact clutches or positive contact clutches may be utilized, as well as other standard methods of coupling such as freewheeling, magnetics or overrunning. It is understood that such coupling and decoupling of the clutches may be appropriately selected by one of ordinary skill in the art. A reversal of the input direction to the drive shaft and hence the reels either momentary or continuous, causes the output clutch to decouple. The output is fully decoupled after the input has displaced approximately 20 degrees in the reverse direction. Additional reverse rotation of the input does not have any further effect on the decoupling action. In the decoupled state, the output and thus the decoupled reel, is free to rotate in either direction.

One of the clutches 109, 110 should be a clockwise oriented clutch 109 and the other a counterclockwise oriented clutch 110. In FIG. 33, the clutches 109, 110 are coupling/decoupling in nature. These clutches consists of an input drum, and output drum, a spring for coupling the two, and a stationary member. The clutches 109, 110 are mounted on the output shaft 26 with set screws 112, 113. A anti-rotation pins 116, 117 prevent rotation of the stationary member of the clutch structure.

A reversible motor 111 is attached to an end of the shaft 26. The motor is further supported by a motor mount 114 which is attached to an adapter plate 115. Stationary pins 116, 117 attached to the clutches 109, 110 are engaged by the adapter plate 115 to prevent rotation of the clutch 109, 110 structures, and the line 48 take-on and take off. When the reversible motor 111 rotates in the clockwise direction, the clockwise oriented clutch 109 engages and drives the reel 36 connected to the clockwise oriented clutch 109 in the take-on direction, thus taking on the line 48. The counter-clockwise oriented clutch 110 decouples and allows the reel connected to the counterclockwise clutch 110 to be freely rotated in a supply direction at a speed demanded by the line 48. When the reversible motor 111 reverses, thus reversing the direction of the shaft 26, the clockwise oriented clutch 109 decouples and the counter clockwise clutch 110 engages reversing the direction of the reel 36, 38 rotation.

A coupling/decoupling clutch may be utilized like the one manufactured by Machine Components Corporation, CDC series and shown in FIG. 41(a), 41(c), 42(a) and with slight modifications applicable to the design of the decoy moving apparatus. Each of these clutch assemblies has a portion which attaches to a shaft connected to the output of a motor and in the decoy moving apparatus, would couple the output of the motor to the reels 36, 38 to produce the rotation to create the takeon/take-off of the line 48.

The reversible motor 111 utilized is operable on DC current with provision for an adapter that would enable a motor to operate on an AC current alternatively. Actuation of the motor would be accomplished by means of manual operation, either direct or remote or by timer mechanism or both.

Figure 34:
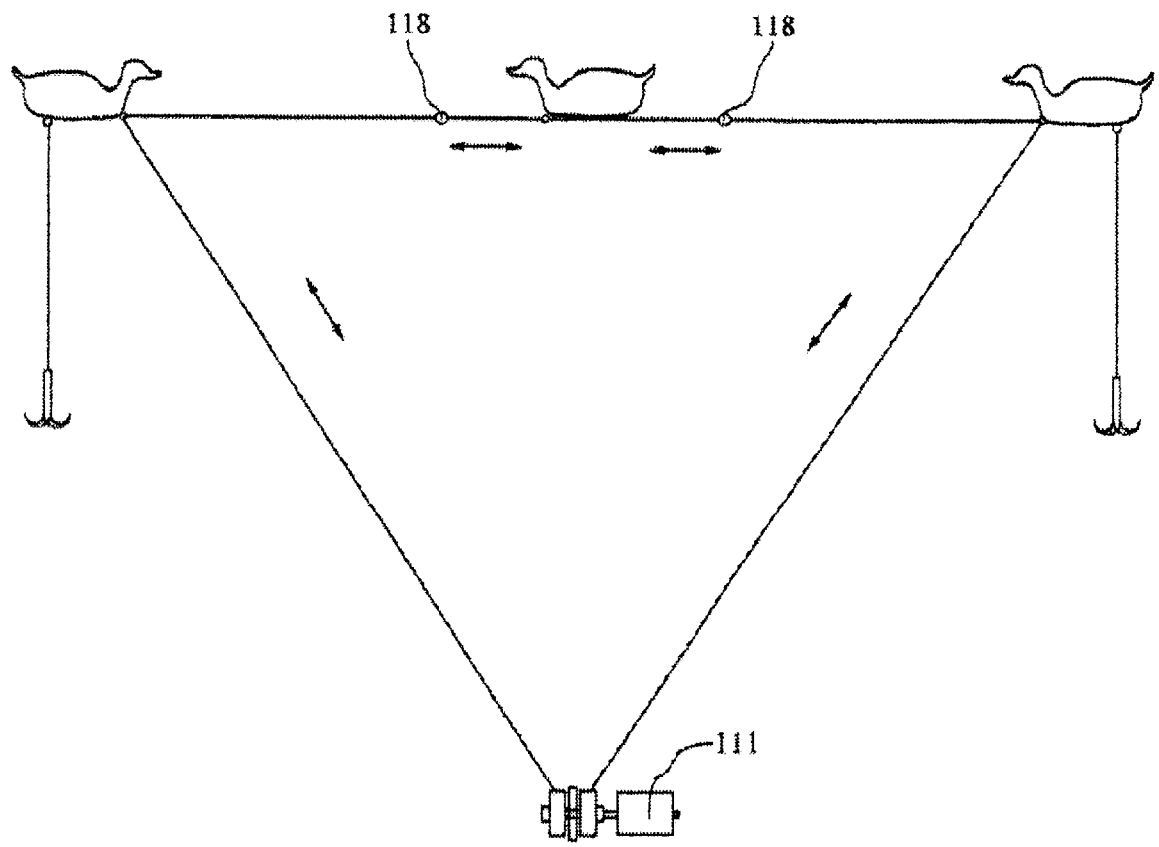
FIG. 34, is a schematic representation showing stops placed on a line used to reverse directions of a reversible motor with a current sensor attached to the power supply.

Reversal of the motor 111 direction can optionally be achieved by use of a current sensor within the motor or attached at the power supply and by affixing stops 118 to the line 48, as seen in FIG. 34, which would prevent further take up of the line 48 when the line 48 encounters a fixed point. The current sensor present in the reversible motor 111 detects the resistance imposed upon the reversible motor 111 and actuates a reversal of direction of the motor 111.

Figure 35:
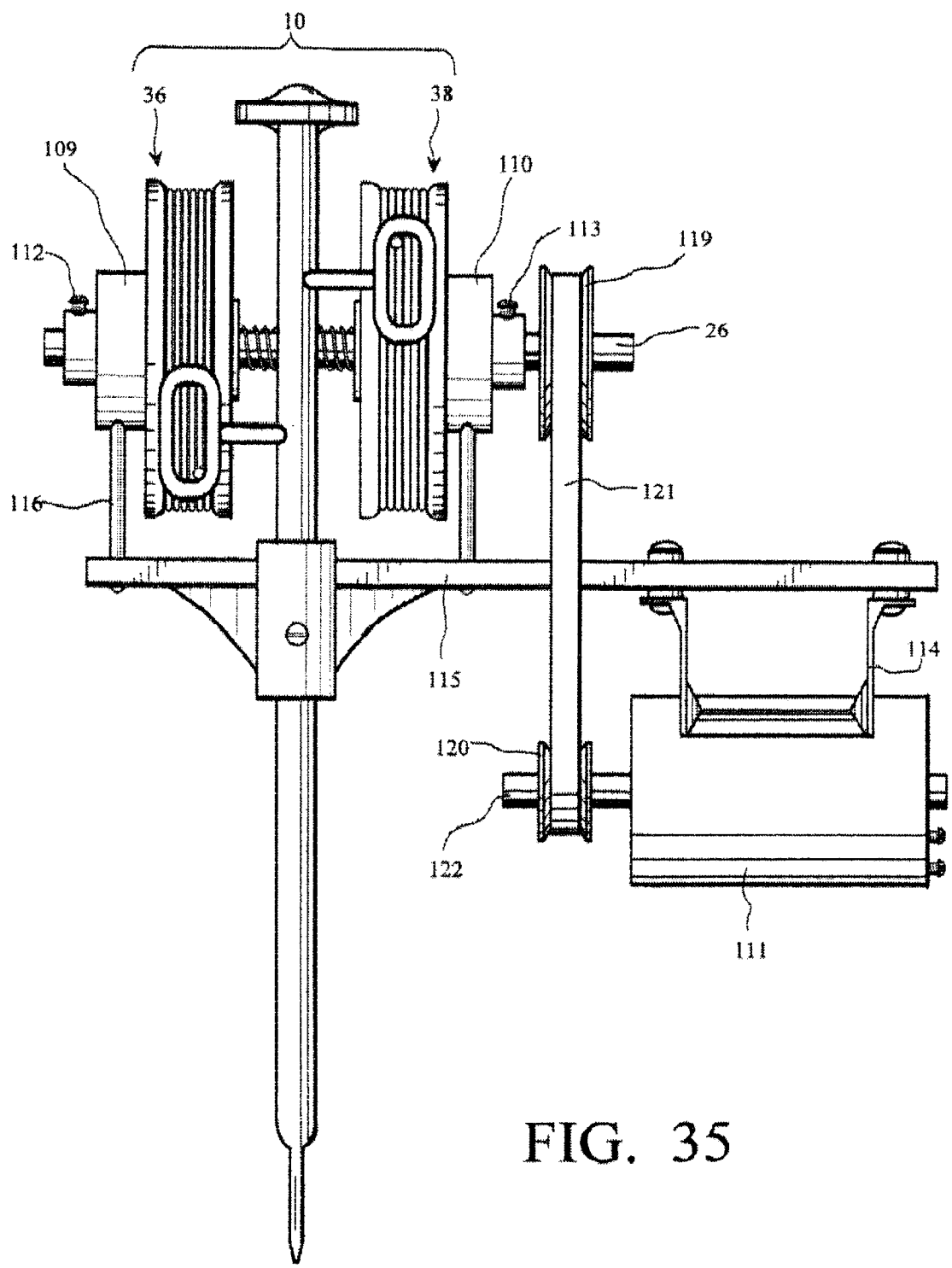
FIG. 35 is a front view of the winding mechanism of an alternate embodiment of the present invention showing a pair of reels mounted on a first shaft of a support frame with a clutch attached to each reel and also mounted on the first shaft and an adapter plate attached to a support frame with a motor attached to the underside of the adapter plate extending out from the frame with the motor connected to a second shaft which is connected to a pulley system used to rotate the first shaft.

FIG. 35 shows another alternative embodiment utilizing a belt 121 and pulleys 119, 120. The motor 111, is attached to the underside of the adaptor plate 115 and has an second output shaft 122 engaged with one of the pulleys 120. The other pulley 119 is attached to the first shaft 26. The motor 111 rotates the second output shaft 122 which in turn rotates the pulley system 123 and activates the clutches 109, 110 and the take-on and take off of the line 48 on the reels 36, 38. It is contemplated that a gear motor can also be utilized with this invention.

Figure 36:
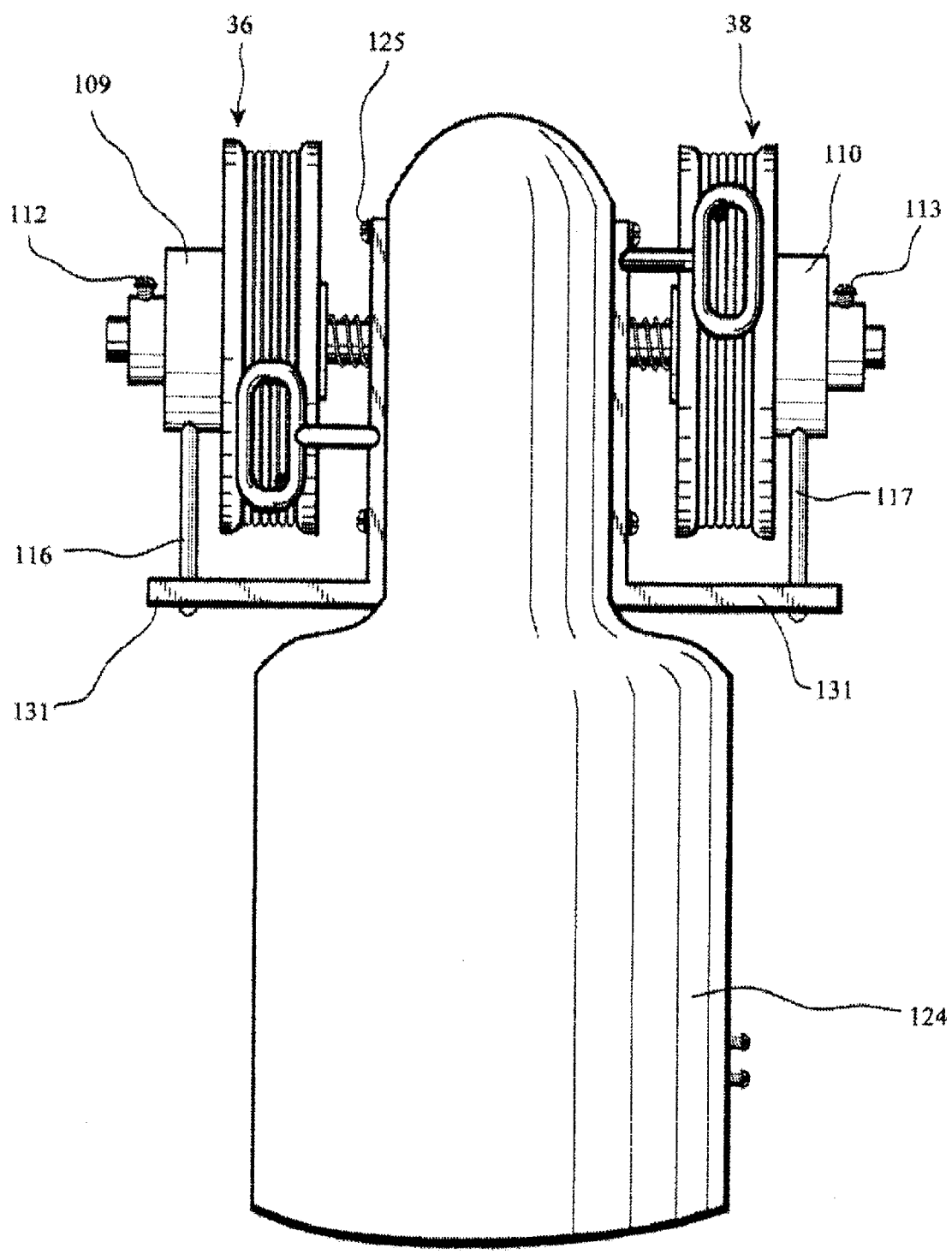
FIG. 36 is a front view of an alternate embodiment of the present invention showing a motor with a shaft extending from the head of the motor and with two reels with clutches attached, both mounted on the shaft.

An alternative embodiment of the invention is in FIG. 36 and includes a reversible motor 124 that supports the shaft 26. In this embodiment, the stationary pins 116, 117 attached to the clutches 109, 110 are mounted to the reversible base motor 124 by mounting plates 131 and with mounting screws 125.

Figure 37:
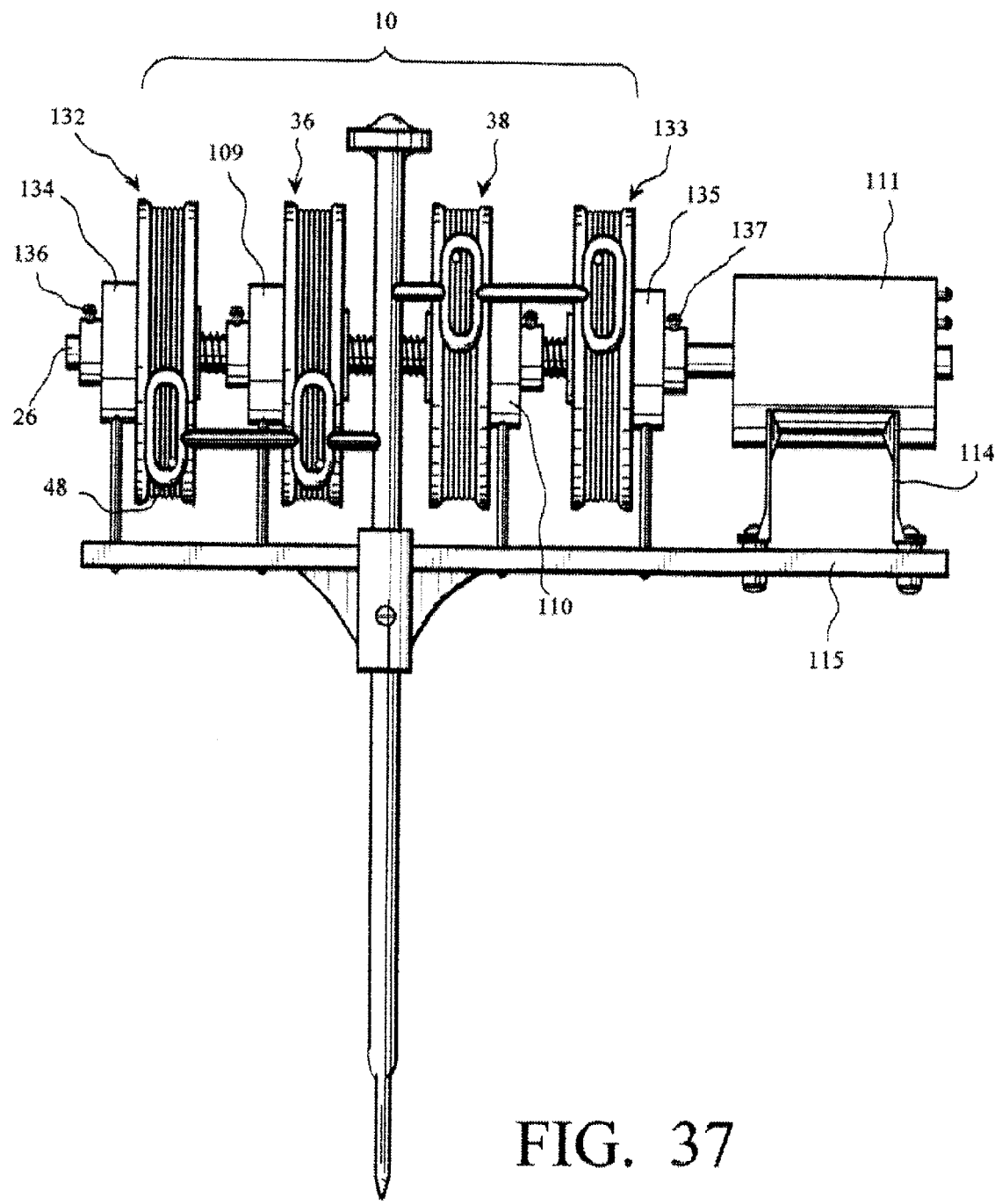
FIG. 37 is a front view of a deep water concealer.

It is contemplated that a plurality of reels may be used in pairs to control additional decoy lines. FIG. 37 shows this alternative embodiment which has a third reel 132 and fourth reel 133 with a third clutch assembly 134 attached to the third reel 132 and a fourth clutch assembly 135 attached to said fourth reel 133. The first clutch assembly 109 and the third clutch assembly 134 would be clockwise oriented clutches and when these clutches engaged, they would drive the reels 36, 132 connected to the clockwise oriented clutches 109, 134 in the take-on direction, thus taking on line 48. The counterclockwise oriented clutches, 110, 135 decouple and allows the reels 38, 133 connected to the counterclockwise clutches 110, 135 to be freely rotated in a supply direction at a speed demanded by the lines 48. When the reversible motor 111 reverses, thus reversing the direction of the shaft 26, the clockwise oriented clutches 109, 134 decouples and the counter clockwise clutch 110, 135 engages reversing the direction of the reels 36, 38, 132, 133 rotation.

Figure 38:
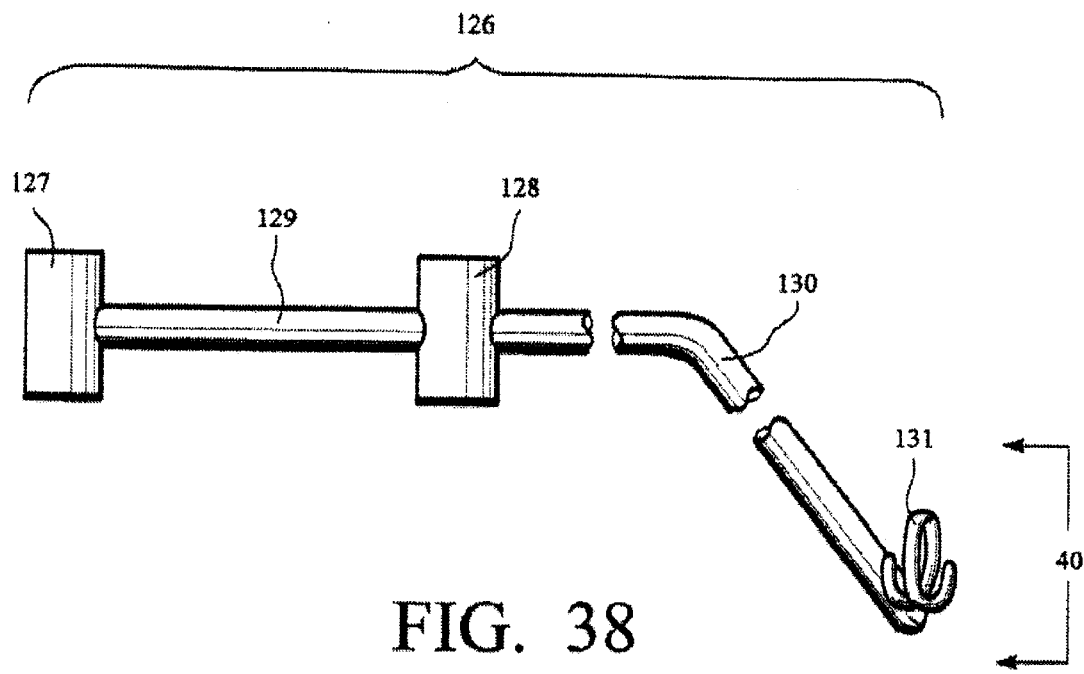
FIG. 38 is a front view of the deep water concealer cooperatively engaged with the legs of the frame and the support base.
Figure 39:
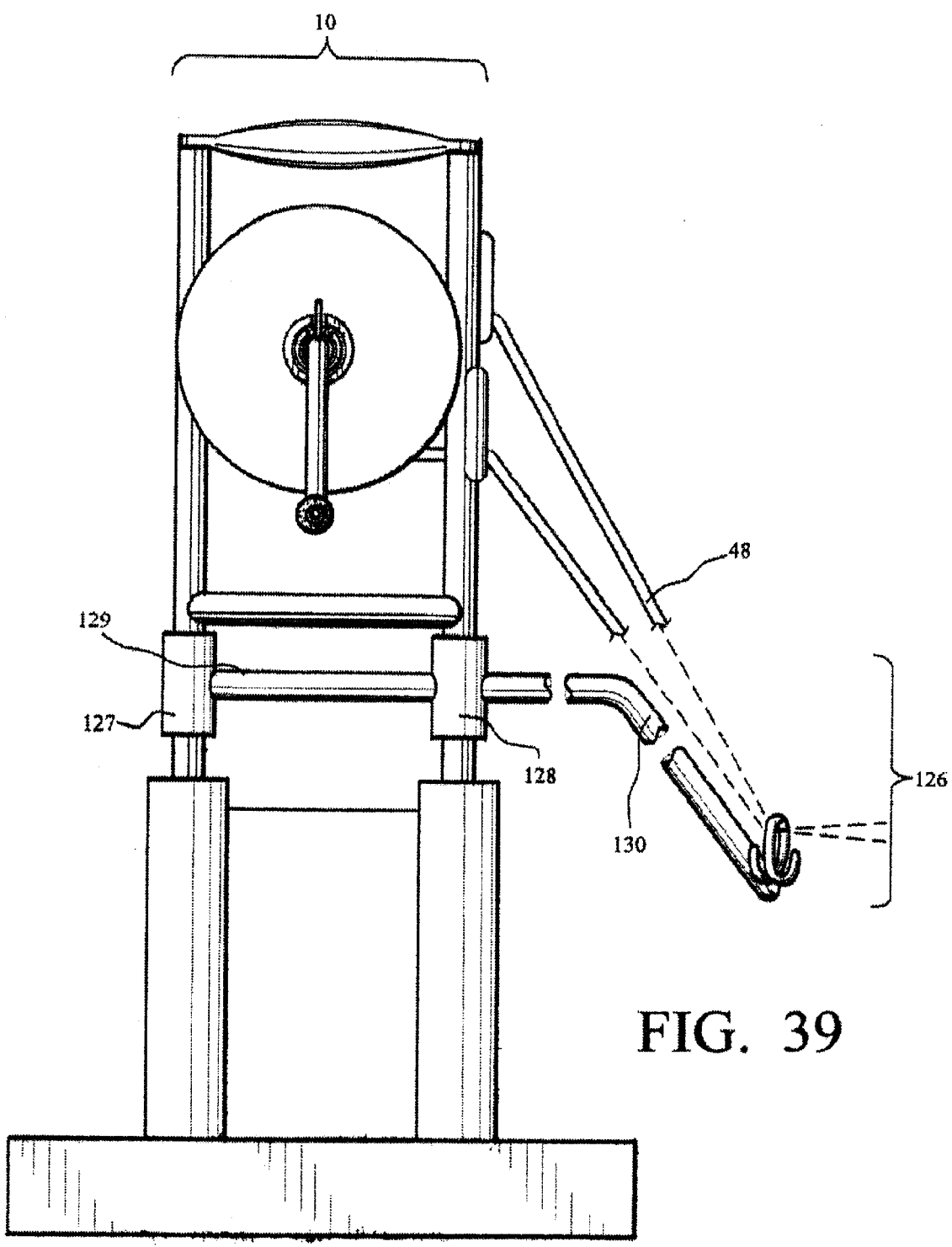
FIG. 39 is a front view of an alternate embodiment of the present invention showing a plurality of reels, clutch assemblies and a motor attached to a shaft.

An additional feature that can be used with the present invention is the deep water concealer 126 shown in FIGS. 38 and 39. When utilizing the decoy moving device in deep water, a means to keep the line that is moving the decoys underwater is needed to prevent the wildlife from seeing the line and also to prevent the lines from rippling the water.

Figure 40:
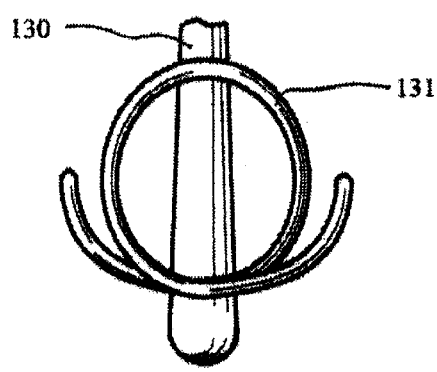
FIG. 40 is front view of the guiding loop of the deep water concealer.

The concealer 126 includes two cylinders 127, 128 connected with a longitudinal member 129 and spaced apart for cooperative engagement with the legs of the winding apparatus. Extending perpendicular from one of the cylinders is a metal arm 130. The metal arm angles downward at an approximate 45 degree angle. Shown in FIG. 40 is a guiding loop 131 which is located at the end of the angled portion of the arm and allows for a line to be placed in the guiding loop 131 after the decoy moving apparatus has been set up. The preferred embodiment is made of metal, more particularly steel; however, it is contemplated that aluminum, wood fiberglass, plastic, polymer composite materials, or combinations thereof could be used in combination with or substituted for the steel components of the concealer.

The foregoing detailed description is given primarily for clearness of understanding and no unnecessary limitation are to be understood there from, for modifications will become obvious to those skilled in the art based upon more recent disclosures and may be made without departing from the spirit of the invention and scope of the appended claims.

I claim:

1. A decoy moving device, comprising:

a shaft;

a motor driveably attached to said shaft;

first and second independently simultaneously rotable reels mounted to said shaft;

a first clutch mounted on said shaft and attached to said first reel; and a second clutch mounted on said shaft and attached to said second reel.

2. The decoy moving device of claim 1, further comprising a frame supporting a sleeve and said sleeve receiving said shaft.

3. The decoy moving device of claim 2, further comprising an adaptor plate attached to said frame and supporting said motor.

4. The decoy moving device of claim 3, further comprising anti-rotation pins attached to said adaptor plate and said first clutch and second clutch.

5. The decoy moving device of claim 4, further comprising a line extendable from said first reel and said second reel to a movable decoy support base.

6. The decoy moving device of claim 5, further comprising anchor pins for anchoring said line in a stationary manner in a desired location.

7. The decoy moving device of claim 6, further comprising a decoy attached to said base.

8. The decoy moving device of claim 2, wherein further comprising a third and fourth reel rotatably attached to said shaft and a third clutch attached to said third reel and a fourth clutch attached to said fourth reel.

9. The decoy moving device of claim 2, further comprising a deep water concealer consisting of two cylinders, a longitudinal member connecting said cylinders, an arm angled downward and a guiding loop.

10. A decoy moving device, comprising;

a shaft;

a motor drivably attached to said shaft;

first and second independently simultaneously rotatable reels mounted to said shaft; and a first and second clutch means for coupling and decoupling said reels.

11. A decoy moving device of claim 10, further comprising a frame supporting a sleeve and said sleeve receiving said shaft.

12. The decoy moving device of claim 10, wherein said clutch means comprises a clutch capable of coupling and decoupling attached to said reels and said shaft.

13. The decoy moving device of claim 10, wherein said clutch means comprises an electromagnetic clutches attached to said reels and said shaft.

* * * * *